United States Patent [19]

Hettinger, Jr. et al.

[11] Patent Number: 4,485,184

[45] Date of Patent: Nov. 27, 1984

[54] TRAPPING OF METALS DEPOSITED ON CATALYTIC MATERIALS DURING CARBOMETALLIC OIL CONVERSION

[75] Inventors: William P. Hettinger, Jr.; H. Wayne Beck, both of Russell; James D. Carruthers, Catlettsburg; Edward B. Cornelius; Stephen M. Kovach, both of Ashland; James L. Palmer, Flatwoods, all of Ky.

[73] Assignee: Ashland Oil, Inc., Ashland, Ky.

[21] Appl. No.: 492,153

[22] Filed: May 10, 1983

Related U.S. Application Data

[63] Continuation of Ser. No. 252,967, Apr. 10, 1981.

[51] Int. Cl.$^3$ .......................... B01J 29/08; B01J 29/18
[52] U.S. Cl. .......................................... 502/67; 502/68
[58] Field of Search ..................................... 502/67, 68

[56] References Cited

U.S. PATENT DOCUMENTS

| | | | |
|---|---|---|---|
| 3,039,953 | 6/1962 | Eng | 252/455 Z |
| 3,830,724 | 8/1974 | Schutt | 252/455 Z |
| 3,864,283 | 2/1975 | Schutt | 252/455 Z |
| 3,925,195 | 12/1975 | Scherzer et al. | 252/455 Z |
| 3,977,963 | 8/1976 | Readal et al. | 208/120 |
| 4,022,714 | 5/1977 | Elliott, Jr. | 252/455 Z |
| 4,101,417 | 7/1978 | Mitchell et al. | 208/120 |
| 4,151,119 | 4/1979 | Gladrow | 252/455 Z |

Primary Examiner—Carl F. Dees
Attorney, Agent, or Firm—Richard C. Willson, Jr.; Stanley M. Welsh

[57] ABSTRACT

A process is disclosed for the treatment of a hydrocarbon oil feed having a significant content of metals to lighter oil products by contacting the feed under conversion conditions in a conversion zone with a catalyst containing a sacrificial trap material sufficient to immobilize Ni-V-Na compounds. Conversion conditions are such that carbonaceous material and metals are deposited on the catalyst in the conversion zone. The catalyst is regenerated in the presence of an oxygen containing gas at a temperature sufficient to remove the carbonaceous deposits, and regenerated catalyst is recycled to the conversion zone for a contact with fresh feed. The sacrificial trap material is present on the catalyst in an amount sufficient to substantially immobilize the metal compounds in the presence of oxygen containing gas at the catalyst regeneration temperature. A catalyst composition for the above conversion comprises a catalytically active alumino-silicate zeolite dispersed in an amorphous inert solid matrix material containing the sacrificial trap material with or without one or more selected metal additives. The sacrificial trap material preferable includes inexpensive naturally occurring or synthetic zeolites which can be ion exchanged with water soluble metal additives.

9 Claims, 12 Drawing Figures

FIG. 6

METAL TOLERANCE

TORTURE TEST METHOD/3-CIS

| Sample No. | Added Metal Type | Wt %IB | Surface Area m²/g | Zeolite % NaY | Rel. Act. | Conv. Vol.% | Conv. Wt % | MAT DATA Gas Wt % | Coke Wt % | Gaso. Wt % | CPF | HPF |
|---|---|---|---|---|---|---|---|---|---|---|---|---|
| B600-159- | | | | | | | | | | | | |
| 1 | Ni | 0.48 | 115 | 7.7 | 98 | 74.8 | 73.4 | 16.6 | 7.1 | 49.6 | 2.5 | 17.0 |
| 2 | Ni | 1.06 | 77 | 3.3 | 74 | 72 | 65.4 | 15.6 | 3.8 | 45.9 | 1.4 | 12.1 |
| 3 | Ni | 2.06 | 66 | 3.6 | 55 | 70 | 62.1 | 13.5 | 3.0 | 45.6 | 1.3 | 15.1 |
| 4 | V | 0.14 | 55 | 4.4 | 52 | 69 | 65.2 | 16.7 | 1.2 | 47.3 | 0.5 | 2.0 |
| 5 | V | 0.24 | 35 | 2.2 | 8 | 52 | 49.9 | 12.2 | 0.5 | 37.2 | 0.4 | 2.5 |
| 6 | V | 0.61 | 11 | 0.0 | 0 | 2 | 12.2 | 5.0 | 0.2 | 7.0 | 0.8 | 7.1 |
| 19 | V | 1.79 | 11 | 0.0 | 0 | 3 | 9.5 | 5.2 | 0.4 | 3.9 | 1.4 | 10.3 |
| 21 | Control | | 73 | 5.4 | 44 | 68 | | | | | 0.9 | 0.4 |
| | Control | | 84 | 7.3 | 127 | 77 | 73.0 | 16.0 | 2.9 | 55.0 | 0.9 | 0.8 |

FIG. 7

METAL TOLERANCE

TORTURE TEST METHOD/3-CIS

| Sample No. | Added Metal Type | Wt.% 1B | Surface Area m²/g | Zeolite NaY | Rel. Act. | Conv. Vol.% | MAT DATA Conv. Wt.% | Gas Wt.% | Coke Wt.% | Gaso. Wt.% | CPF | HPF |
|---|---|---|---|---|---|---|---|---|---|---|---|---|
| B600-159- | | | | | | | | | | | | |
| 10 | Ni | 0.49 | 240 | 8.6 | 456 | 88 | 78.3 | 17.6 | 5.7 | 55.0 | 1.3 | 11.5 |
| 11 | Ni | 1.13 | 239 | 8.8 | 188 | 81 | 75.0 | 19.2 | 4.9 | 50.8 | 1.5 | 13.8 |
| 12 | Ni | 2.27 | 219 | 8.3 | 186 | 81 | 74.4 | 16.9 | 7.2 | 50.2 | 2.1 | 28.0 |
| 13 | V | 0.13 | 238 | 8.1 | 341 | 86 | 80.5 | 22.6 | 3.6 | 54.3 | 0.9 | 2.7 |
| 14 | V | 0.34 | 213 | 7.4 | 192 | 81 | 75.5 | 20.4 | 3.0 | 52.0 | 0.9 | 9.7 |
| 15 | V | 0.55 | 211 | 6.9 | 97 | 74.7 | 68.7 | 15.2 | 4.6 | 49.0 | 1.7 | 16.6 |
| 20 | V | 1.11 | 159 | 3.5 | 27 | 63 | 58.4 | 11.8 | 4.6 | 42.0 | 2.3 | 31.9 |
| 22 | Control | | 143 | 4.8 | | | | | | | | |
| | Control | | 242 | 7.8 | 213 | 82 | 80.0 | 21.6 | 4.8 | 53.6 | 1.3 | 1.3 |

MAT. CONVERSION VS. RELATIVE ACTIVITY
REFERENCE CATALYST CONVERSION : 75%
DAVISON FEEDSTOCK

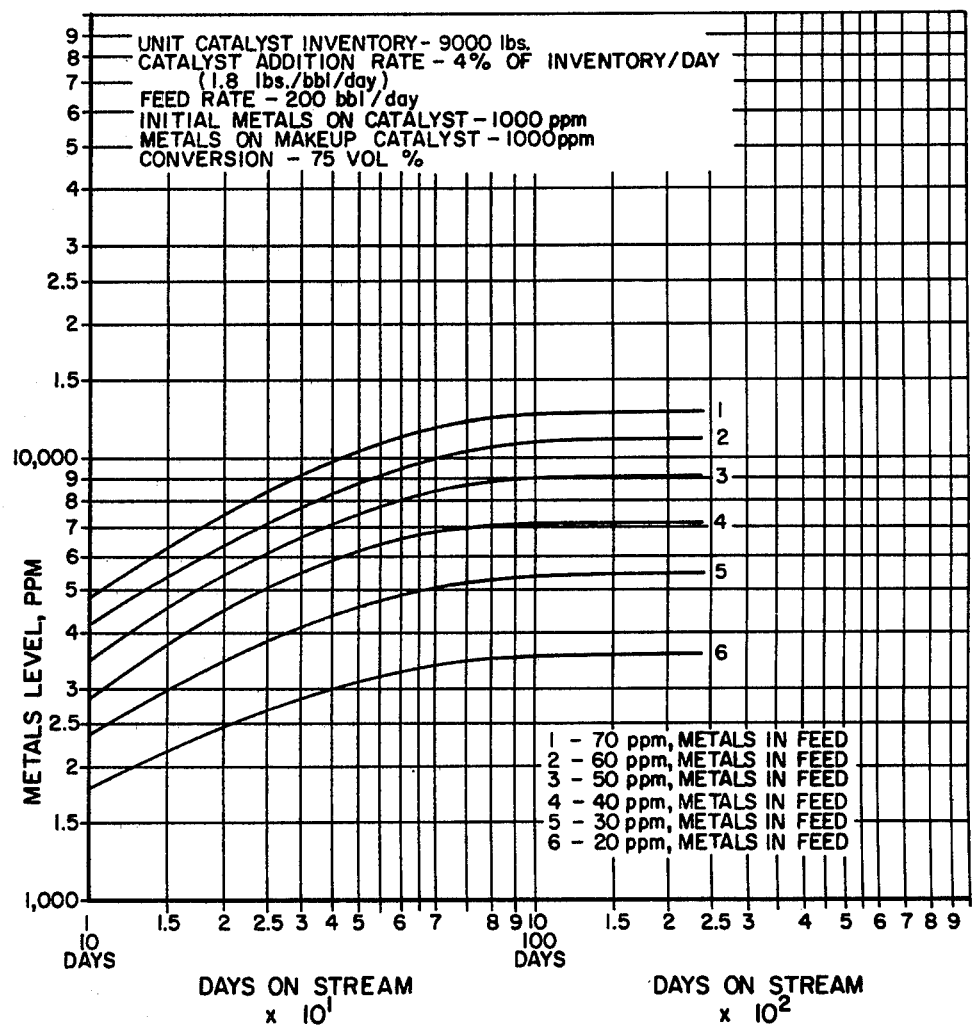

TRAPPING OF METALS DEPOSITED ON CATALYTIC MATERIALS DURING CARBOMETALLIC OIL CONVERSION

This application is a continuation of application Ser. No. 06/252,967, filed Apr. 10, 1981.

TECHNICAL FIELD

This invention relates to an improved catalyst, one or more methods for its preparation, and a process for its use in the conversion of carbo-metallic oils to liquid transportation and/or heating fuels. More particularly, the invention is related to a catalyst composition comprising a catalytically active crystalline aluminosilicate zeolite uniformly dispersed within a matrix containing a low cost sacrifical zeolitic metal trap to trap Ni, V, Na deposited on the catalyst during the conversion reaction, and in particular to immobilize vanadium oxides. In addition, metal additives for effecting vanadia immobilization may be incorporated in these sacrificial zeolitic traps.

BACKGROUND OF THE INVENTION

The introduction of catalytic cracking to the petroleum industry in the 1930's constituted a major advance over previous techniques with the object to increase the yield of gasoline and its quality. Early fixed bed, moving bed, and fluid bed catalytic cracking FCC processes employed vacuum gas oils (VGO) from crude sources that were considered sweet and light. The terminology of sweet refers to low sulfur content and light refers to the amount of material boiling below approximately 1,000°–1,025° F.

The catalysts employed in early homogeneous fluid dense beds were of an amorphous siliceous material, prepared synthetically or from naturally occurring materials activated by acid leaching. Tremendous strides were made in the 1950's in FCC technology in the areas of metallurgy, processing equipment, regeneration and new more-active and more stable amorphous catalysts. However, increasing demand with respect to quantity of gasoline and increased octane number requirements to satisfy the new high horsepower-high compression engines being promoted by the auto industry, put extreme pressure on the petroleum industry to increase FCC capacity and severity of operation.

A major breakthrough in FCC catalysts came in the early 1960's, with the introduction of molecular sieves or zeolites. These materials were incorporated into the matrix of amorphous and/or amorphous/kaolin materials constituting the FCC catalysts of that time. These new zeolitic catalysts, containing a crystalline aluminosilicate zeolite in an amorphous or amorphous/kaolin matrix of silica, alumina, silica-alumina, kaolin, clay or the like were at least 1,000–10,000 times more active for cracking hydrocarbons than the earlier amorphous or amorphous/kaolin containing silica-alumina catalysts. This introduction of zeolitic cracking catalysts revolutionized the fluid catalytic cracking process. New processes were developed to handle these high activities, such as riser cracking, shortened contact times, new regeneration processes, new improved zeolitic catalyst developments, and the like.

The new catalyst developments revolved around the development of various zeolites such as synthetic types X and Y and naturally occurring faujasites; increased thermal-steam (hydrothermal) stability of zeolites through the inclusion of rare earth ions or ammonium ions via ion-exchange techniques; and the development of more attrition resistant matrices for supporting the zeolites. The zeolitic catalyst developments gave the petroleum industry the capability of greatly increasing throughput of feedstock with increased conversion and selectivity while employing the same units without expansion and without requiring new unit construction.

After the introduction of zeolite containing catalysts the petroleum industry began to suffer from a lack of crude availability as to quantity and quality accompanied by increasing demand for gasoline with increasing octane values. The world crude supply picture changed dramatically in the late 1960's and early 1970's. From a surplus of light-sweet crudes the supply situation changed to a tighter supply with an ever increasing amount of heavier crudes with higher sulfur contents. These heavier and high sulfur crudes presented processing problems to the petroleum refiner in that these heavier crudes invariably also contained much higher metals and Conradson carbon values, with accompanying significantly increased asphaltic content.

Fractionation of the total crude to yield cat cracker charge stocks also required much better control to ensure that metals and Conradson carbon values were not carried overhead to contaminate the FCC charge stock.

The effects of metals (the term metals herein will refer to Ni-V-Na present in the feedstock and/or deposited on the catalyst during processing of the feedstock) and Conradson carbon on a zeolite containing FCC catalyst have been described in the literature as to their highly unfavorable effect in lowering catalyst activity and selectivity for gasoline production and their equally harmful effect on catalyst life. In particular, we have shown that vanadium, at high concentrations in the feed, is especially detrimental to catalyst life.

As mentioned previously, these heavier crude oils also contained more of the heavier fractions and yielded less or a lower volume of the high quality FCC charge stocks which normally boils below 1025° F., and are usually processed, so as to contain total metal levels below 1 ppm, preferably below 0.1 ppm, and Conradson carbon values substantially below 1.0.

With this increasing supply of heavier crudes, which meant lowered yeilds of gasoline, and the increasing demand for liquid transportation fuels, the petroleum industry began a search for processing schemes to utilize these heavier crudes in producing gasoline. Many of these processing schemes have been described in the literature. These include Gulf's Gulfining and Union Oil's Unifining processes for treating residuum, UOP's Aurabon process, Hydrocarbon Research's H-Oil process, Exxon's Flexicoking process to produce thermal gasoline and coke, H-Oil's Dynacracking and Phillip's Heavy Oil Cracking (HOC). These processes utilize thermal cracking or hydrotreating followed by FCC or hydrocracking operations to handle the higher content of metals (Ni-V-Fe-Cu-Na) and high Conradson carbon values of 5–15. Some of the drawbacks of this type of processing are as follows: coking yields thermally cracked gasoline which has a much lower octane value than cat cracked gasoline and is unstable due to the production of gum from diolefins and requires further hydrotreating and reforming to produce a high octane product; gas oil quality is degraded due to thermal reactions to produce a product containing refractory polynuclear aromatics, and high Conradson carbon levels which are highly unsuitable for catalytic cracking; and hydrotreating requires expensive high pressure hydrogen, multi-reactor systems made of special alloys, costly operations, and a separate costly facility for the production of hydrogen.

To better understand the reasons why the industry has progressed along the processing schemes described, one must understand the known and established effects of contaminant metals (Ni-V-Fe-Cu-Na) and Conradson carbon on the zeolite containing cracking catalysts and the operating parameters of a FCC unit. Metal content and Conradson carbon are two very effective restraints on the operation of a FCC unit and may even impose undesirable restraints on a Reduced Crude Conversion (RCC) unit from the standpoint of obtaining maximum conversion, selectivity and life. Relatively low levels of these contaminants are highly detrimental to a FCC unit. As metals and Conradson Carbon levels are increased still further, the operating capacity and efficiency of a RCC unit may be adversely affected or made uneconomical. These adverse effects occur even though there is enough hydrogen in the feed to produce an ideal gasoline consisting of only toluene and isomeric pentenes (assuming a catalyst with such ideal selectivity could be devised).

The effect of increased Conradson carbon is to increase that portion of the feedstock converted to coke deposited on the catalyst. In typical VGO operations employing a zeolite containing catalyst in a FCC unit, the amount of coke deposited on the catalyst averages about 4–5 wt% of the feed. This coke production has been attributed to four different coking mechanisms, namely, contaminant coke from adverse reactions caused by metal deposits, catalytic coke caused by acid site cracking, entrained hydrocarbons resulting from pore structure adsorption and/or poor stripping, and Conradson carbon resulting from pyrolytic distillation of hydrocarbons in the conversion zone. There has been postulated two other sources of coke present in reduced crudes in addition to the four present in VGO. They are: (1) adsorbed and absorbed high boiling hydrocarbons which do not vaporize and cannot be removed by normally efficient stripping, and (2) high molecular weight nitrogen containing hydrocarbon compounds adsorbed on the catalyst's acid sites. Both of these two new types of coke producing phenomena add greatly to the complexity of resid processing. Therefore, in the processing of higher boiling fractions, e.g., reduced crudes, residual fractions, topped crude, and the like, the coke production based on feed is the summation of the four types present in VGO processing (the Conradson carbon value generally being much higher than for VGO), plus coke from the higher boiling unstrippable hydrocarbons and coke associated with the high boiling nitrogen containing molecules which are adsorbed on the catalyst. Coke production on clean catalyst, when processing reduced crudes, may be estimated as approximately 4 wt% of the feed plus the Conradson carbon value of the heavy feedstock.

The coked catalyst is brought back to equilibrium activity by burning off the deactivating coke in a regeneration zone in the presence of air and the regenerated catalyst is recycled back to the reaction zone. The heat generated during regeneration is removed by the catalyst and carried to the reaction zone for vaporization of the feed and to provide heat for the endothermic cracking reaction. The temperature in the regenerator is normally limited because of metallurgical limitations and the hydrothermal stability of the catalyst.

The hydrothermal stability of the zeolite containing catalyst is determined by the temperature and steam partial pressure at which the zeolite begins to rapidly lose its crystalline structure to yield a low activity amorphous material. The presence of steam is highly critical and is generated by the burning of adsorbed (sorbed) carbonaceous material which has significant hydrogen content (hydrogen to carbon atomic ratios generally greater than about 0.5). This carbonaceous material is principally the high boiling sorbed hydrocarbons which boiling points as high as 1500°–1700° F. or above that have a modest hydrogen content and the high boiling nitrogen containing hydrocarbons, as well as related porphyrins and asphaltenes. The high molecular weight nitrogen compounds usually boil above 1025° F. and may be either basic or acidic in nature. The basic nitrogen compounds may neutralize acid sites while those that are more acidic may be attracted to metal sites on the catalyst. The porphyrins and asphaltenes also generally boil above 1025° F. and may contain elements other than carbon and hydrogen. As used in this specification, the term "heavy hydrocarbons" includes all carbon and hydrogen compounds that do not boil below about 1025° F., regardless of whether other elements are also present in the compound.

The heavy metals in the feed are generally present as porphyrins and/or asphaltenes. However, certain of these metals, particularly iron sodium and copper, may be present as the free metal or as inorganic compounds resulting from either corrosion of process equipment or contaminants from other refining processes.

As the Conradson carbon value of the feedstock increases, coke production increases and this increased load will raise the regeneration temperature; thus the unit may be limited as to the amount of feed that can be processed, because of its Conradson carbon content.

Earlier VGO units operated with the regenerator at 1150°–1250° F. A new development in reduced crude processing, namely, Ashland Oil's "Reduced Crude Conversion Process" as described in the pending U.S. applications referenced below, can operate at regenerator temperatures in the range of 1350°–1400° F. But even these higher regenerator temperatures place a limit on the Conradson carbon value of the feed at approximately 8, which represents about 12–13 wt% coke on the catalyst based on the weight of feed. This level is controlling unless considerable water is introduced to further control temperature, which addition is also practiced in Ashland's RCC processes.

The metal containing fractions of reduced crudes contain Ni-V-Fe-Cu in the form of porphyrins and asphaltenes. These metal containing hydrocarbons are deposited on the catalyst during processing and are cracked in the riser to deposit the metal or carried over by the coked catalyst as the metallo-porphyrin or asphaltene and converted to the metal oxide during regeneration. The adverse effects of these metals as taught in the literature are to cause nonselective or degradative cracking and dehydrogenation to produce increased amounts of coke and light gases such as hydrogen, methane and ethane, and neutralization of the active cracking sites. These mechanisms adversely affect selectivity, resulting in poor yields and quality of gasoline and light cycle oil. The increased production of light gases, while impairing the yield and selectivity of the process, also puts an increased demand on gas compressor capacity. The increase in coke production, in addition to its negative impact on yield, also adversely affects catalyst activity-selectivity, greatly increases regenerator air demand and compressor capacity and may result in uncontrollable and/or dangerous regenerator temperatures.

DISCLOSURE OF THE INVENTION

This invention is for an improved catalyst composition and its use for the conversion of petroleum oil feeds containing significant levels of metals (Ni-V-Na) in an amount of at least about 0.1 ppm). More particularly, a sacrificial zeolitic metal trap and/or a sacrificial zeolitic trap containing one or more metal additives to immobilize vanadia are provided in the catalyst composition to reduce the deactivation effect of catalytically active crystalline alumino-silicate zeolites by the metal contaminants in oil feeds—of all types utilized in FCC and/or RCC operations. The invention is particularly useful in the processing of carbo-metallic oil components found in whole crudes, residual oil and reduced crude feeds in a modern fluid catalytic cracking unit herein referred to as a reduced crude cracking (RCC) unit.

It has long been known that topped crudes, residual oils and reduced crudes with high contaminating metals levels present serious problems as to catalyst deactivation at relatively high metal concentrations on the catalyst, e.g., 5,000-10,000 ppm in combination with elevated regenerator temperatures. Nickel and especially sodium lead to neutralization of the active acidic cracking sites. It has now been particularly recognized that when reduced crude containing feeds with high vanadium to nickel levels are processed over a crystalline zeolite containing catalyst, and especially at high vanadium levels on the catalyst, rapid deactivation of the zeolite can occur. This deactivation manifests itself in substantial measure as a loss of the crystalline zeolitic structure. This loss has been observed at vanadium levels of 1,000 ppm or less. The loss in the crystalline zeolitic structure becomes more rapid and severe with increasing levels of vanadium and at vanadium levels about 5,000 ppm, particularly at levels approaching 10,000 ppm complete destruction of the zeolite structure may occur. Prior to the present invention, it was believed impossible to operate economically at vanadium levels higher than 10,000 ppm because of this phenomenon. Prior to this invention, vanadium deactivation at vanadium levels of less than 10,000 ppm has been retarded by increasing the addition rate of virgin catalyst and by lowering regenerator temperatures. Lowering regenerator temperatures has the disadvantage of requiring higher catalyst to oil ratios which increase the amount of coke produced and adversely affect desired product yields. Increasing catalyst addition rates is also costly and can result in an uneconomical operation.

Some crude oils and some FCC charge stocks obtained from the distillation of crude oils contain significant amounts (greater than 0.1 ppm) of heavy metals such as Ni, V, Fe, Cu, Na. Residual oil fractions, and particularly reduced crudes obtained from crude oil distillation operations are prone to have even greater amounts of the metal contaminants as well as have high Conradson carbon values. According to the present invention, these high boiling residual oils are converted to liquid transportation and distillate heating fuels by contact with a catalyst composition comprising a crystalline zeolitic catalyst containing a catalytically active zeolite for conversion of the carbo-metallic hydrocarbon components of the feed in combination with an inexpensive sacrificial crystalline zeolite of a pore size sufficient to trap metal oxides deposited on the catalyst during hydrocarbon conversion. A metal additive particularly associated with the catalyst containing a sacrificial zeolite is provided in one embodiment to immobilize vanadium oxides deposited on the catalyst during the conversion of the metals contaminated hydrocarbon feed. As used throughout the specification, "vanadia" refers collectively to the oxides of vanadium.

It has been found that vanadium is especially detrimental to catalyst life activity. As the vanadium oxide level builds up on the catalyst, the elevated temperatures encountered in a catalyst regeneration operation cause vanadium pentoxide ($V_2O_5$) for example to melt and this liquid vanadia to flow in and about the catalyst particles. Among other things, this liquid vanadia enters the crystalline zeolite structure leading to a neutralization of acid sites and more significantly to an irreversible destruction of the crystalline aluminosilicate structure so as to form a much less catalytically active amorphous material. In addition, this melting and flowing of liquid vanadia over catalyst particulate materials with low surface area, can also coat the outside surface of the catalyst microspheres with liquid and thereby cause coalescence between catalyst particles which adversely affects their fluidization properties. The catalyst composition of this invention includes a sacrificial zeolite metal trap with or without one or more metal additives which will form compounds or complexes with the contaminating metals deposited on the catalyst, especially with vanadia. These compounds or complexes have melting points above the temperatures encountered particularly in the regeneration step, to minimize destruction of an active cracking crystalline zeolite, minimize zeolite acid site neutralization, and more particularly to avoid surface sintering and particle fusion.

The one or more select metal additives which may be exchanged into or otherwise added to the selected sacrificial zeolite trap are chosen for the particular purpose of immobilizing vanadia while simultaneously avoiding neutralization of acidic cracking sites. In the investigation leading to this invention some additives which did affect the melting point of vanadia were eliminated as being unsatisfactory additives due to their negative effect on catalyst activity of the particularly desired catalytically active crystalline zeolites. In contrast titania and zirconia are particularly desirable additives since they not only tie up the vanadia as a complex but, in combination with silica, they form acidic catalysts with cracking activity in their own right.

The exchange of the metal additive into the selected sacrifical zeolite trap can be accomplished during catalyst manufacture. Metal additive exchange during manufacture may be made either in the catalyst slurry before particle formation or by exchange after catalyst particle formation, such as after spray drying of the catalyst slurry to form microspheres. It is to be understood that the catalyst particles can be of any size, depending on the size appropriate to the conversion process in which the catalyst is to be employed. Thus, while a fluidizable particle size is preferred, the sacrificial metal traps with/without metal additives may be employed with larger size particles, such as those suitable for use in a moving catalyst bed system in contact with unvaporized heavy oil feeds.

The problems of the prior art caused by metal containing contaminants especially vanadium, are overcome in substantial measure by employing a catalyst composition comprising a selected crystalline zeolite for entrapment of deposited metals either with or without one or more metal additives which will complex with the contaminant metals in the manner desired. The concepts of this invention are especially effective in the processing of high boiling hydrocarbons such as residual oils, reduced crudes and other carbo-metallic comprising hydrocarbon feeds with high metals, high vanadium to nickel ratios and high Conradson carbon values. These high boiling hydrocarbon feeds having high metal and Conradson carbon values are preferably contacted in a riser cracking zone with a catalytic composition of this invention also comprising a crystalline zeolite of relatively high cracking activity and surface area at temperatures above about 950° F. Residence time of the hydrocarbon material in contact with catalyst in the riser is below 5 seconds, and preferably within the range of 0.5–2 seconds. A preferred catalyst prepared according to this invention is a spray dried composition in the form of microspherical particles generally in the size range of about 10 to 200 microns, preferably about 20 to 150 microns and more preferably between about 40 and 80 microns, for use in a fluidized catalyst cracking system.

The high boiling feed is introduced to a bottom portion of a riser cracking zone wherein it contacts the catalyst at a temperature in the range of 1275° to 1450° F. to provide a temperature at the exit of the riser in a catalyst disengagement vessel within the range of 950°–1100° F. Along with the heavy oil or reduced crude feed may be added one or more of water, steam, naphtha, flue gas, or other vapors provided to aid in atomization-vaporization of the feed and assist as a lift gas to control hydrocarbon residence time within limits desired and provide other benefits described in applications referred to herein.

A coked catalyst comprising hydrocarbonaceous and metal deposits is rapidly separated from the hydrocarbon vapors at the exit of the riser cracking zone by employing any one of a number of different arrangements known in the prior art. One suitable arrangement is the vented riser concept described in U.S. Pat. Nos. 4,066,533 and 4,070,159 to Myers, et al, which patents are incorporated herein by reference thereto. During the course of the hydrocarbon conversion in the riser zone, metals and Conradson carbon compounds are deposited on the catalyst. After separation, the catalyst contaminated with metals and hydrocarbonaceous deposits is recovered as a dense but fluffed bed at the bottom of the disengagement vessel before being transferred to a stripper zone and then to a catalyst regeneration zone. The contaminated catalyst is then contacted in the regeneration zone with an oxygen containing gas to remove hydrocarbonaceous material through combustion to carbon oxides to yield a regenerated catalyst containing less than 0.1 wt% residual carbon, preferably less than 0.05 wt% residual carbon. The regenerated catalyst is then recycled at a desired elevated temperature to the bottom of the riser zone where it again contacts high metal and Conradson carbon containing oil feed to repeat the cycle.

At the elevated temperatures normally encountered in the regeneration zone, within the range of 1275° F. to 1500° F., the vanadium deposited on the catalyst in the riser is converted to vanadium oxides, in particular, vanadium pentoxide. The melting point of vanadium pentoxide is much lower than the temperature encountered in the regeneration zone. Thus, it can become a mobile liquid and flow across the catalyst surface, causing pore plugging, particle coalescence, and more importantly, enter the pores of the active cracking zeolite, where it causes irreversible crystalline collapse of the crystalline zeolite to form an amorphous material.

This invention is particularly directed to and describes a new approach to offsetting the adverse effect of Ni-V-Na metal contaminants deposited on a catalyst composition and especially deposited vanadium pentoxide. The essence of the invention comprises the incorporation of a selected sacrificial metal trap material with or without one or more particular metal additives into a catalyst matrix during manufacture, as by addition to the undried catalyst composition, or by known techniques after spray drying or by other particle forming techniques. These sacrificial traps serve to immobilize vanadia by creating complexes, compounds or alloys of vanadia having melting points which are higher than the temperature encountered in the regeneration zone.

The select sacrificial trap materials for immobilizing metals include the following materials: Type A molecular sieves (ammonium, magnesium and calcium exchanged A sieves), mordenites, chabazites, pillared interlayered clay (smectites, montmorillonites), and/or low cost ion exchanged naturally occurring zeolites, erionite, offretite or inexpensive faujasites. This select group of zeolites can be exchanged with a metallic ion to enhance stability or eliminate sodium or potassium and to immobilize vanadia by forming a complex with one or more additive metals selected from the following group of metals: Mg, Ca, Sr, Ba, Sc, Y, La, Ti, Zr, Hf, Nb, Ta, Mn, Ni, In, Tl, Bi, Te, and the Actinide and Lanthanide series of elements. The selected sacrificial trap materials may be used in concentration ranges of from about 1 to 40 percent by weight of virgin catalyst. The metal additive added to the sacrificial trap material may be present in concentration ranges from about 0.1 to 8 percent by weight of virgin catalyst.

The catalytically active cracking crystalline zeolite compound of the catalyst composition is preferably a high activity crystalline aluminosilicate zeolite. Molecular sieves or crystalline aluminosilicates are initially formed as alkali metal aluminosilicates, which are dehydrated forms of crystalline hydrous siliceous zeolites. However, since the alkali form does not have appreciable activity and alkali metal ions are deleterious to the cracking processes, the aluminosilicates are ion exchanged to replace sodium with some other ion such as, for example, ammonium ions and/or rare earth metal ions. The silica and alumina making up the structure of the zeolite are arranged in a definite crystalline pattern containing a large number of small uniform cavities interconnected by smaller uniform channels or pores. The effective size of these pores is usually between about 4A and 12A.

The catalytically active cracking zeolites that can be employed in accordance with this invention include both natural and synthetic zeolites. An example of natural occurring zeolites include faujasite and the like. Suitable synthetic zeolites include zeolite, Y, L, ZK-4B, B, E, F, H, J, M, Q, T, W, X, Z, ZSM-types, alpha, beta and omega. These catalytically active cracking zeolites may be used in concentration ranges of from about 10 to 40 weight percent and include combinations of one or more of the active zeolites.

The sacrificial trap materials which can be employed in accordance with this invention include both natural and synthetic zeolites. The natural occurring zeolites including gmelinite, clinoptilolite, chabazite, dechiardite, heulandite, erionite, analcite, levynite, sodalite, cancrinite, nephelite, lcyurite, scolicite, natrolite, offretite, mesolite, mordenite, brewsterite, ferrierite, and the like. Suitable synthetic zeolites include zeolites A, cheap faujasite, mordenite, interlayered clay, lamellar 2-layered clays (smectite, montmorillonites). The term "zeolites" as used herein contemplates not only alumino-silicates but substances in which the aluminum is replaced by gallium and substances in which the silicon is replaced by germanium.

The matrix material used to form the catalyst of this invention should possess good hydrothermal stability. Examples of materials exhibiting relatively stable pore characteristics are alumina, silica-alumina, silica, clays such as kaolin, meta-kaolin, halloysite, anauxite, dickite and/or nacrite, and combinations of these materials. Other clays, such as montmorillonite, may be added to increase the acidity of the matrix. Clay may be used in its natural state or thermally modified.

BRIEF DESCRIPTION OF THE DRAWINGS

FIG. 6 is a table giving catalyst parameters and conversion data relative to the amount of nickel or vanadium on a catalyst of relatively low surface area.

FIG. 7 is a table giving catalyst parameters and conversion data relative to the amount of nickel or vanadium on a catalyst of relatively high surface area.

FIG. 12 is a graph showing the time required to buildup metals on a catalyst at varying metals level in feed and a catalyst addition rate of 4% of inventory.

DISCUSSION OF SPECIFIC EMBODIMENTS

Figure 1:
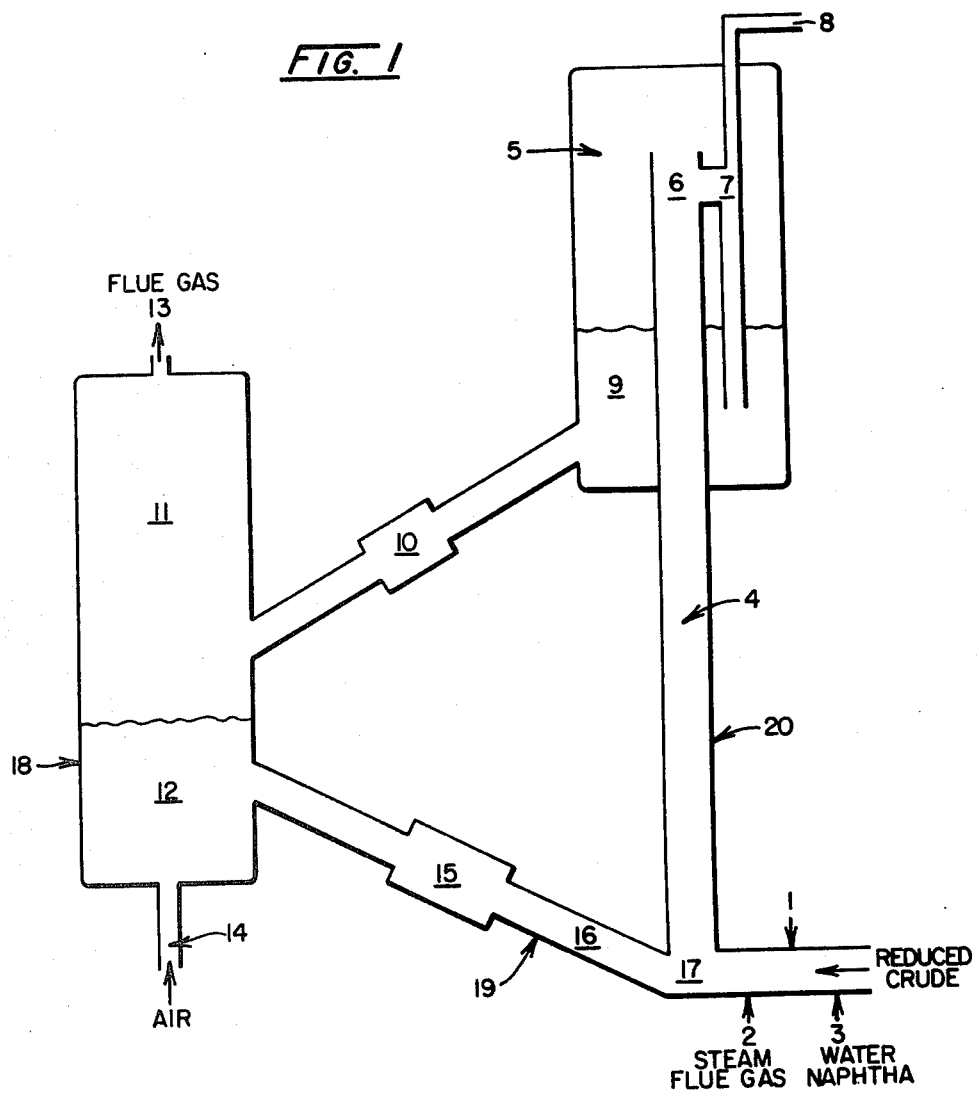
FIG. 1 is a schematic diagram of an apparatus for carrying out the process of the invention.
Figure 2:
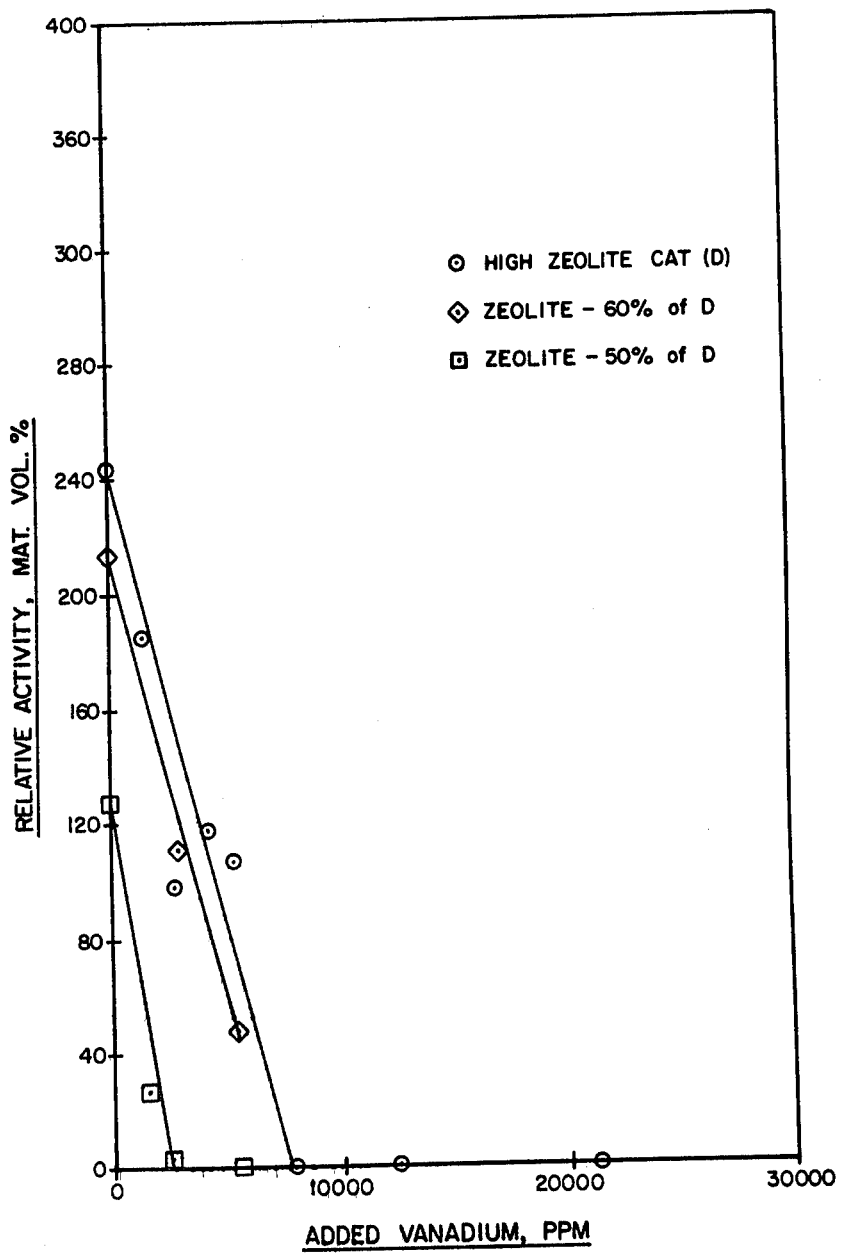
FIG. 2 is a graph showing the change in catalytic activity with increasing amounts of vanadium on the catalyst.
Figure 3:
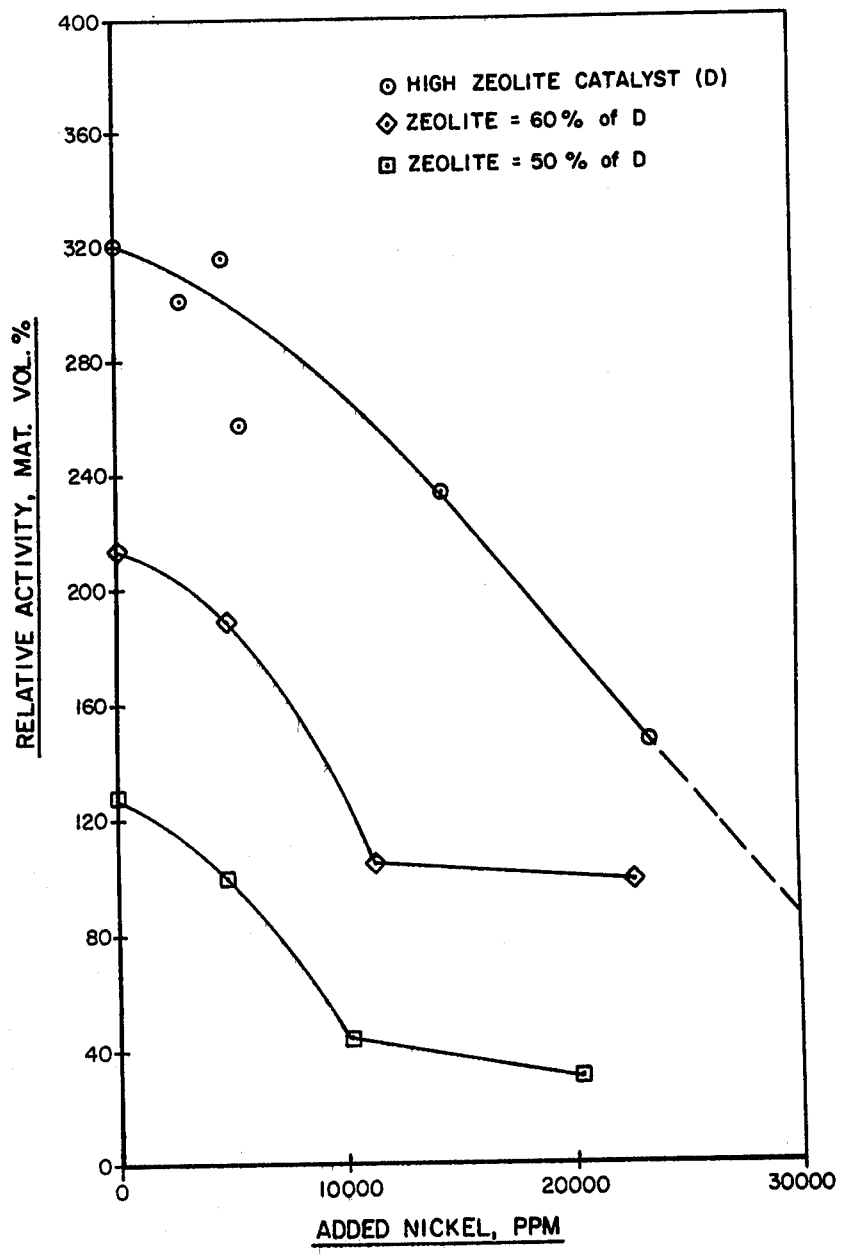
FIG. 3 is a graph showing the changes in catalytic activity with increasing amounts of nickel on the catalyst.
Figure 4:
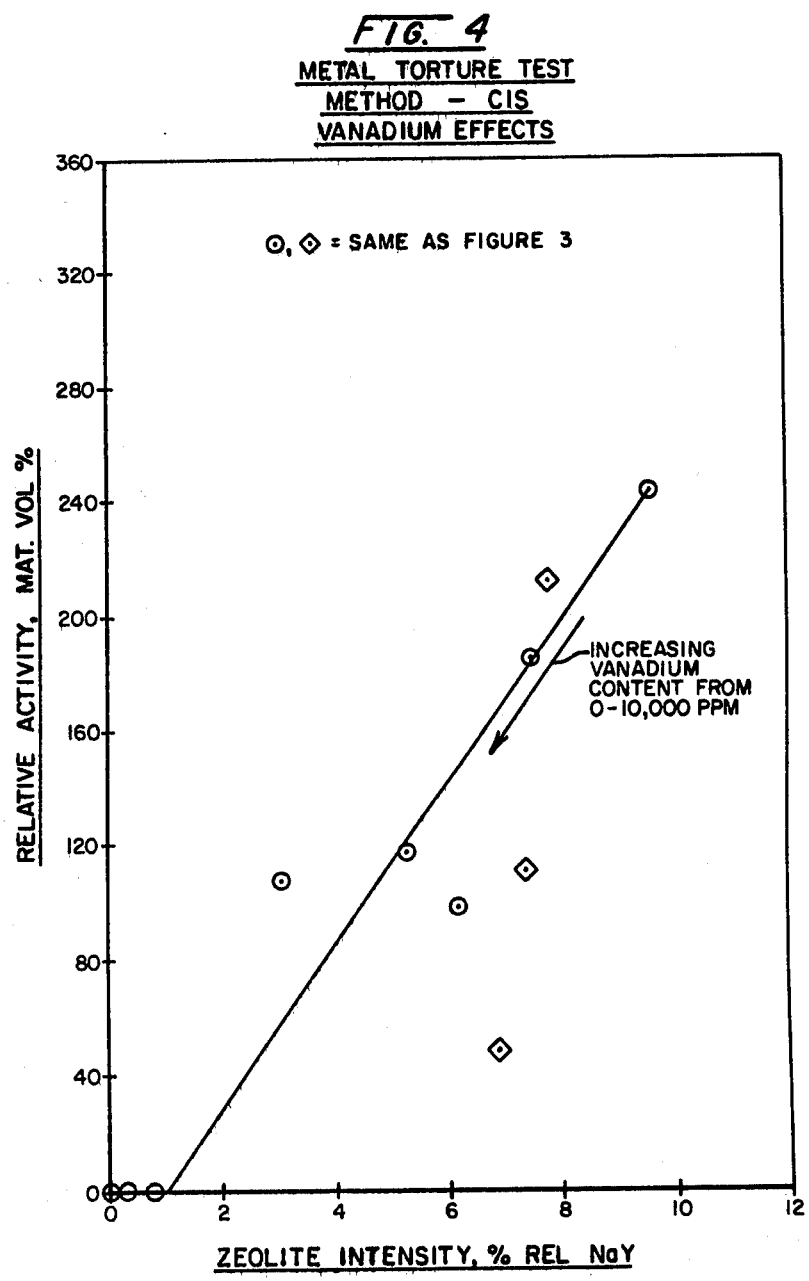
FIG. 4 is a graph showing the loss of crystalline aluminosilicate zeolite with increasing amounts of vanadium on the catalyst.
Figure 5:
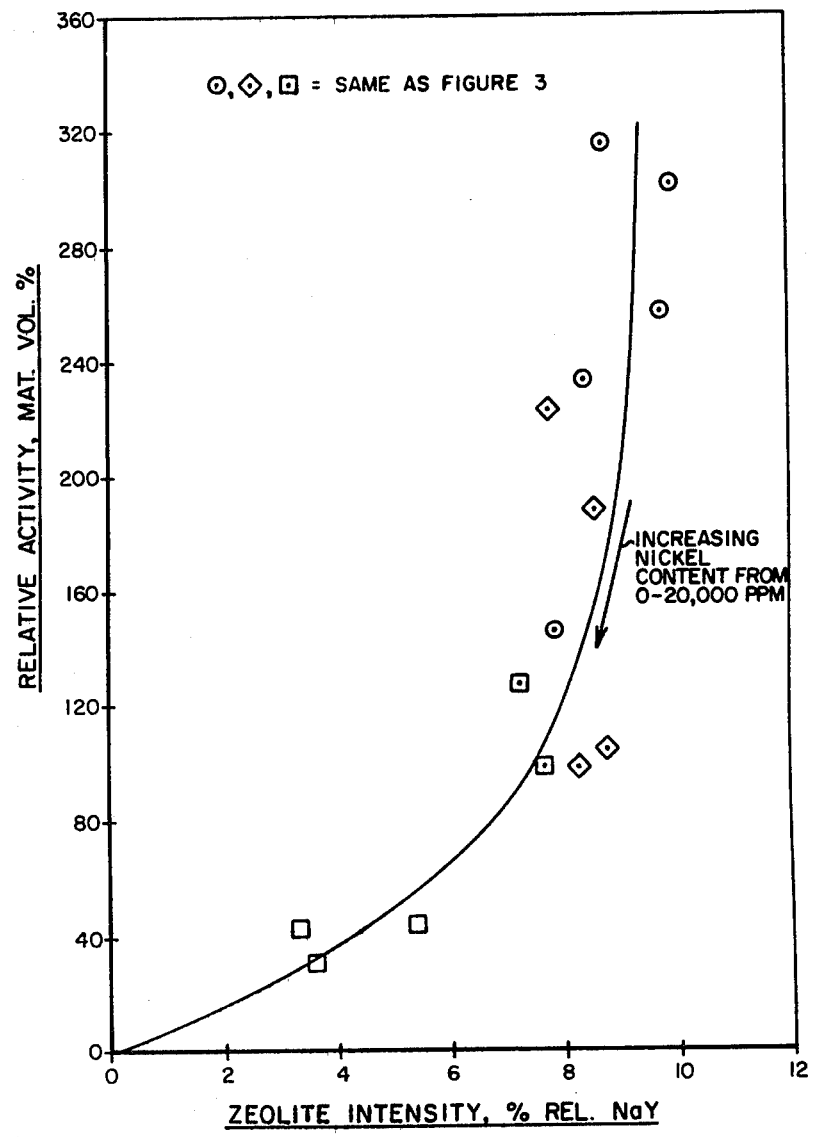
FIG. 5 is a graph showing the loss of crystalline aluminosilicate zeolite with increasing amounts of nickel on the catalyst.
Figure 8:
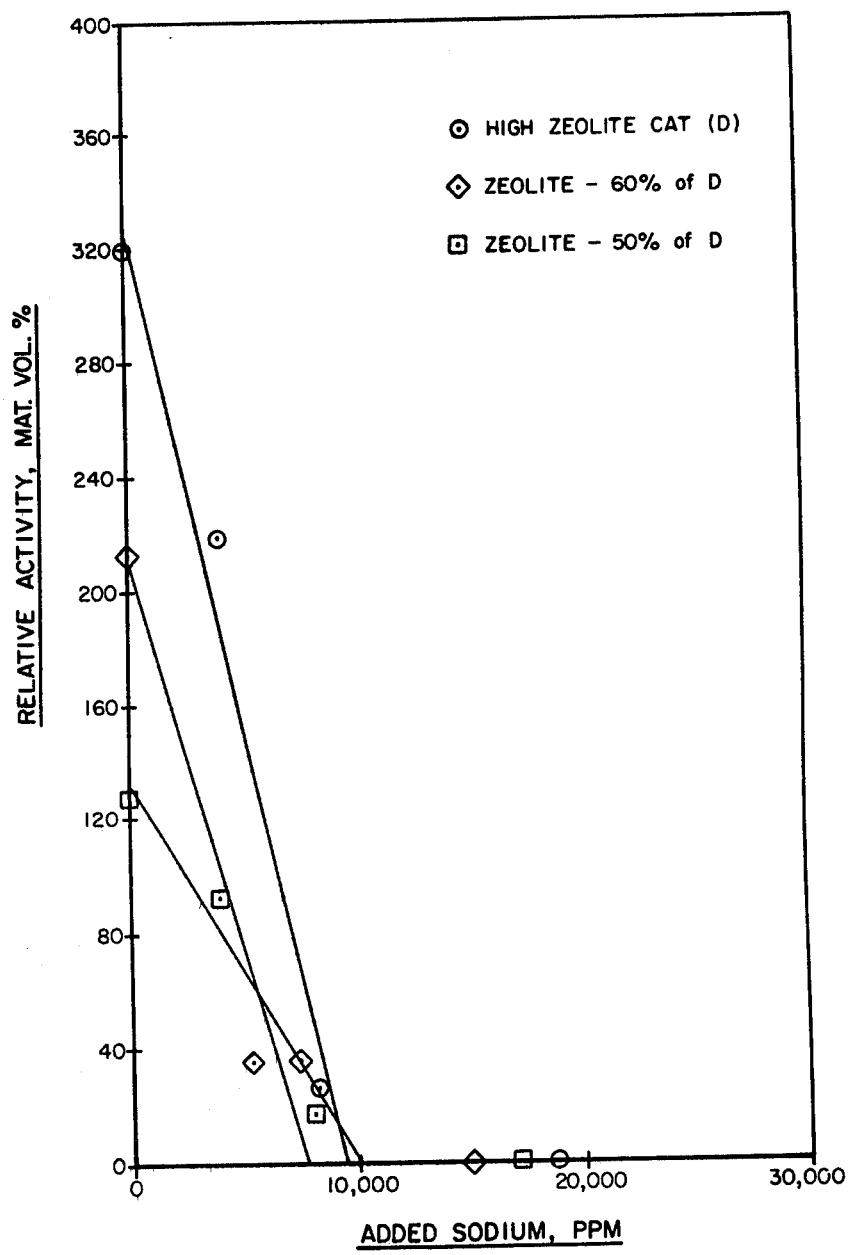
FIG. 8 is a graph showing the changes in catalytic activity with increasing amounts of sodium on the catalyst.
Figure 9:
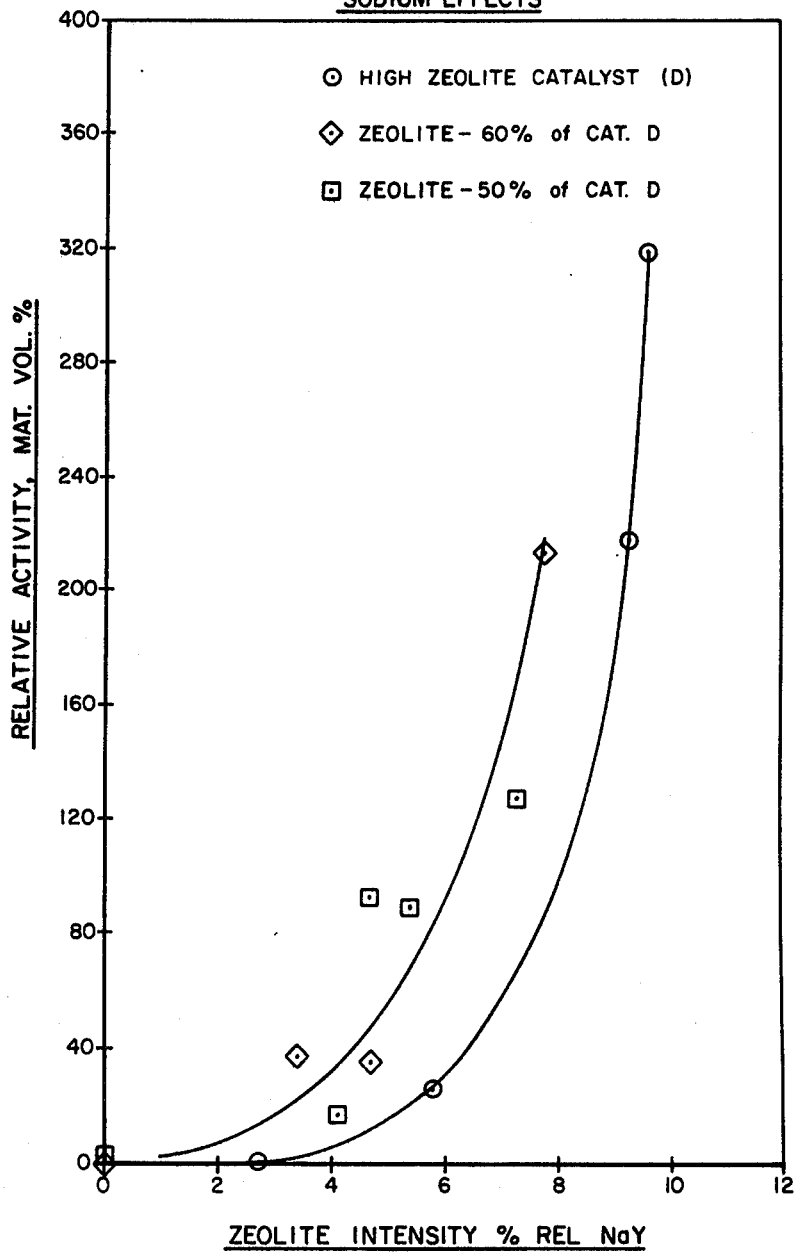
FIG. 9 is a graph showing the loss of crystalline aluminosilicate zeolite with increasing amounts of sodium on the catalyst.

The exact embodiment by which the trapping of metal contaminants and the immobilization of vanadia occurs is not completely understood and is not intended to be defined herein, except to say that the sacrificial trap material with and without metal additive material will form in one or more ways, compounds, complexes or species reactive with the contaminant metals to provide stabilities and/or immobilization capabilities equal to or greater than the zeolite alone at the temperatures encountered in a regeneration zone. A 0.5 to 10 ratio of a sacrificial trap material to vanadium content on catalyst is identified as a minimum, although initially, the amount of sacrificial trap material may be considerably above this ratio as it is incorporated in the catalyst during preparation and prior to use, after which the ratio of the sacrificial trap to vanadia will gradually decrease as vanadium is continuously deposited on the catalyst. The concentration range of the sacrificial trap of 0.5 to 10 times the weight of vanadium deposited on the catalyst is chosen so as to encompass both technical and economic factors such as feedstock, stability and cost of sacrificial trap materials as to spray drying and attrition resistance.

The sacrificial trap material contemplated for use by this invention may also be exchanged with one or more select metals. The preferred minimum atomic ratio of additive metal to vanadium to be maintained on the catalyst is at least 0.5 to 1.0 depending on the number of additive metal atoms in the oxide of the additive metal, e.g. $TiO_2$ or $In_2O_3$, forming a stable, high melting binary oxide material with vanadium pentoxide ($V_2O_5$). Thus, at the preferred ratio, the melting point of the binary oxide material should be generally well above the operating temperatures of the regenerator. Although, initially, the amount of additive metal will be considerably above the preferred minimum ratio if it is incorporated in the catalyst prior to use, the ratio of additive metal to vanadium on the catalyst will decrease as vanadium is deposited on the catalyst. This 0.5 or 1.0 minimum ratio approach was employed to identify and confirm suitable metal additives which can form binary mixtures with vanadium pentoxide so as to yield a solid material that has a melting point of at least about 1600° F., preferably at least about 1700° F., more preferably 1800° F. or higher, at the preferred ratio. This high melting point product ensures tha vanadia will not melt, flow, and enter the catalytically active zeolite cage structure to cause destruction of the zeolite's crystalline structure as previously described.

EXAMPLES OF ADDITIVES

The additive metals of this invention include those elements from the Periodic chart of elements shown in Table A. The melting points of Table A are based on a 1:1 mole ratio of the metal additive oxide in its stable valence state under regenerator conditions to vanadium pentoxide.

TABLE A

| | | M.P. of 1/1 Mixture - °F. |
|---|---|---|
| Group IIA | Mg, Ca, Sr, Ba | >1800 |
| Group IIIB | Sc, Y, La | 1800–2100 |
| Group IVB | Ti, Zr, Hf | 1700–2000 |
| Group VB | Nb, Ta | 1800–2000 |
| Group VIIB | Mn, Tc, Re | >1750 |
| Group VIII | Ni, Ru, Rh, Pd, Os, Ir, Pt | >1600 |
| Group IIIA | In, Tl | >1800 |
| Group VA | Bi, As, Sb | >1600 |
| Lanthanide Series | All | >1800 |
| Actinide Series | All | >1800 |

This invention also recognizes that mixtures of these additive metals with vanadia may occur to form high melting ternary, quaternary, or higher component reaction mixtures, such as vanadium titanium zirconate ($VO-TiO_2-ZrO_2$). In addition, binary, ternary and/or quaternary reaction mixtures can occur with metals not covered in the Groups above.

TABLE B

| COMPOUND | M.P. °F. |
|---|---|
| $Ba_3-V-Ti_2O_9$ | >1800 |
| $BaO-K_2O-TiO_2-V_2O_4$ | >1800 |
| $BaO-Na_2O-TiO_2-V_2O_5$ | >1800 |

It will be recognized by those skilled in the art that the present invention is intended to cover the lower oxidation states of vanadium as well as vanadium pentoxide. However, in processing a sulfur containing feed and regeneration of the catalyst used in the presence of an oxygen containing gas, vanadium will also likely form compounds, such as vanadium sulfites, sulfates, and oxysulfides, which may also form binary, ternary, quaternary or higher component reaction mixtures with the metal additives of this invention.

While not intending to be bound by any one theory or mechanism, it is believed that a reaction of the metal additive with vanadia generally yields a binary reaction product. In the case of manganese acetate reacting with vanadium pentoxide, the compound formed was tentatively identified as $Mn_2V_2O_7$. When titania was reacted with vanadium pentoxide, no true compound could be identified because the reaction is believed to involve the substitution of $Ti^{+4}$ in the crystalline structure by $V^{+4}$. Thus, the disappearance of the titania X-ray pattern and the vanadium pentoxide X-ray pattern was observed, indicating vanadium substitution.

A preferred group of metal additives that may be incorporated with the sacrificial trap material are magnesium, calcium, barium, bismuth, titanium, zirconium, manganese, indium, lanthanum, or a mixture of these metals. Metals such as magnesium, calcium, barium and bismuth may be incorporated by ion exchange.

If the metal additive is incorporated directly into the sacrificial trap material during catalyst manufacture or at some time before the catalyst is introduced into the conversion system such as by the regenerated catalyst standpipe, the metal additives are preferably water soluble inorganic salts of these metals, such as the acetate, halide, nitrate, sulfate, sulfite and/or carbonate. These additive compounds are soluble in a catalyst slurry or in a water exchanging solution.

EXAMPLES OF MATRICES

A preferred matrix material is a semi-synthetic combination of clay and silica-alumina as described in U.S. Pat. No. 3,034,994. Preferably the clay is mostly a kaolinite and is combined with a synthetic silica-alumina hydrogel or hydrosol. This synthetic component forms preferably about 15 to 75 percent, more preferably about 20 to 25 percent, of the formed catalyst by weight. The proportion of clay is such that the catalyst preferably contains after forming, about 10 to 75 percent, more preferably about 20 to 40 percent, clay be weight. The most preferred composition of the matrix contains approximately twice as much clay as synthetically derived silica-alumina. The synthetically derived silica-alumina should contain 55 to 95 percent by weight of silica ($SiO_2$), preferably 65 to 85 percent, most preferably about 75 percent. Catalysts wherein the gel matrix consists entirely of silica gel or alumina gel are also included.

Various processes may be used in preparing the synthetic silica-alumina matrix, such as those described in U.S. Pat. No. 3,034,994, which patent is incorporated herein by reference, thereto. One of these processes involves gelling an alkali metal silicate with an inorganic acid while maintaining the pH on the alkaline side. An aqueous solution of an acidic aluminum salt is then intimately mixed with the silica hydrogel so that the aluminum salt solution fills the silica hydrogel pores. The aluminum is thereafter precipitated as a hydrous alumina by the addition of an alkaline compound.

As a specific example of this method of preparation, a silica hydrogel is prepared by adding sulfuric acid with vigorous agitation and controlled temperature, time and concentration conditions to a sodium silicate solution. Aluminum sulfate in water is then added to the silica hydrogel with vigorous agitation to fill the gel pores with the aluminum salt solution. An ammonium solution is then added to the gel with vigorous agitation to precipitate the aluminum as hydrous alumina which combines with silica at the surface of the silica hydrogel pores. The hydrous gel is then processed, for instance, by separating a part of the water on vacuum filters and then drying, or more preferably, by spray drying the hydrous gel to produce microspheres. The dried product is then washed to remove sodium and sulfate ions, either with water or a very weak acid solution. The resulting product is then dried to a low moisture content, usually less than 25 percent by weight, e.g., 10 percent to 20 percent by weight, to provide the finished catalyst product.

EXAMPLES OF CATALYTICALLY ACTIVE ZEOLITES

The catalytically active zeolite materials utilized in the preferred embodiments of this invention are faujasites which possess silica to alumina ratios in the range from about 2.5 to 7.0, preferably 3.0 to 6.0 and most preferably 4.5 to 6.0. Synthetic faujasites are widely known crystalline aluminosilicate zeolites and common examples of synthetic faujasites are the X and Y types which are commercially available. The ultrastable hydrogen exchanged zeolites, such as Z-14XS and Z-14US are also particularly suitable.

A preferred synthetic faujasite is zeolite Y which may be prepared as described in U.S. Pat. No. 3,130,007 and U.S. Pat. No. 4,010,116, which patents are incorporated hereby by reference thereto. The aluminosilicates of this latter patent have high silica ($SiO_2$) to alumina ($Al_2O_3$) molar ratios, preferably above 4, to give high thermal stability.

The following is an example of a zeolite produced by the silication of clay. A reaction composition is produced from a mixture of sodium silicate, sodium hydroxide, and sodium chloride formulated to contain 5.27 mole percent $SiO_2$, 3.5 mole percent $Na_2O$, 1.7 mole percent chloride and the balance water. 12.6 parts of this solution are mixed with 1 part by weight of calcined kaolin clay. The reaction mixture is held at about 60° F. to 75° F. for a period of about four days. After this low temperature digestion step, the mixture is heated with live steam to about 190° F. until crystallization of the material is complete, for example, about 72 hours. The crystalline material is filtered and washed to give a silicated clay zeolite having a silica to alumina ratio of about 4.3 and containing about 13.5 percent by weight of $Na_2O$ on a volatile free basis. Variation of the components and of the times and temperatures, as is usual in commercial operations, will produce zeolite having silica to alumina mole ratios varying from about 4 to about 5. Mole ratios above 5 may be obtained by increasing the amount of $SiO_2$ in the reaction mixture. The sodium form of the zeolite is then exchanged with polyvalent cations to reduce the $Na_2O$ content to less than about 1.0 percent by weight, and preferably less than 0.1 percent by weight. Procedures for removing alkali metals and putting the zeolite in the proper form are well-known in the art as described in U.S. Pat. Nos. 3,293,192; 3,402,996; 3,446,727; 3,449,070; and 3,537,816; which patents are incorporated herein by reference thereto.

The amount of catalytically active zeolitic material dispersed in the matrix based on the final fired product should be at least about 10 weight percent, preferably in the range of about 20 to 50 weight percent, most preferably about 20 to 40 weight percent.

Crystalline aluminosilicate zeolites exhibit acidic sites on both interior and exterior surface with the largest proportion of total surface area and cracking sites being internal to the particles within the crystalline micropores. These zeolites are usually crystallized as regularly shaped, discrete particles of approximately 0.1 to 10 microns in size and, accordingly, this is the size range normally provided by commercial catalyst suppliers. To increase exterior (portal) surface area, the particle size of the zeolites for the present invention should preferably be in the range from less than 0.1 micron to 1 micron and more preferably in the lower portion of this size range. The preferred zeolites are thermally stabilized with hydrogen and/or rare earth ions and are steam stable to about 1,650° F.

EXAMPLES OF SACRIFICIAL TRAPS

The less expensive zeolites referred to herein as sacrificial trap material utilized in the preferred embodiments of this invention are Type A zeolite, 5A zeolite, mordenites, chabazites, pillared interlayered clays, and the like. The 5A zeolite may be prepared as described in U.S. Pat. No. 4,160,011 and U.S. Pat. No 4,248,847, which patents are incorporated herein by reference.

The following are examples for the preparation of an A sieve.

4.46 $m^3$ of a sodium aluminate solution the sodium aluminate content of which is equivalent to a molar ratio $Na_2O/AlO_3$ of 6.2 and a molar ratio $H_2O/Na_2O$ of 28 and 0.54 $m^3$ of a sodium silicate solution the sodium silicate content of which is equivalent to a ratio $Na_2O/SiO_2$ of 0.83 and a ratio $H_2O/NaO_2$ of 13.4 are each heated separately to a temperature of 90° C.

Both solutions are introduced into a syphon pipe reactor at the above indicated by volume ratio and are mixed under high agitation as intensely as possible within 7 minutes. From the beginning, the suspension of the precipitate which is formed in the reaction is maintained in an agitated state by means of a propeller agitator (diameter 550 mm, inner diameter of the reactor 1700 mm) which is placed close to the bottom of the reactor and is turning at a speed of 240 revolutions per minute. After a crystallization period of 75 minutes at a temperature of 90° C., the mixture is cooled to a temperature of 50° C. within a period of about 20 minutes and is filtered. The filtered precipitate product is washed until the filtration wash water exhibits a pH value of 10.7.

The composition of resulting sodium aluminosilicate corresponds to the molar ratio of oxides of $Na_2O$-$Al_2O_3$-$2SiO_2$-$4.5H_2O$. The product is then dried at a temperature of 80° C. by means of circulating hot air.

30 grams of the dry amorphous material is treated five times with a one molar solution of calcium formate solution allowing 30 minutes contacting for each exchange. After final filtering and reconstituting with water, the mixture is aged for 24 hours at room temperature and heated in a closed vessel at 225° F. for 16 hours. This yields a 5A (Ca) crystalline aluminosilicate containing 0.74% sodium and 14.3% calcium.

The following is an example of a cheap mordenite sacrificial trap material produced from chemicals and amorphous materials.

In an electrically stirred open beaker, 13.432 gms of N-Sodium silicate solution ($0.3Na_2O$-$SiO_2$-$7.3H_2O$) and 8.4201 gms $H_2O$ and 1.0444 gms sodium hydroxide are stirred until the sodium hydroxide has dissolved. 10.00 gms of uncalcined cracking catalyst (amorphous gel of composition $Al_2O_3$-$10.38SiO_2$-$5.18H_2O$ and trace ammonia, size range 20-120 micrometers, are sprinkled slowly into the mixture while stirring and then 4.3094 gms of sodium chloride are sprinkled in. Stirring is continued until the gel is homogeneously dispersed. The resulting mix has a molar composition of $2.6Na_2O$-$Al_2O_3$-$6NaCl$-$15.6SiO_2$-$80H_2O$. Simultaneously with the stirring, and in adjacent area, a sample of hydrogen mordenite (H Zeolon) is being processed and airborne particles of the mordenite serve as seed in the beaker. The mixture is autoclaved at 176° for 20 hours, and then 180° for 4 hours, is washed with 200 mls. of water, vacuum filtered and is dried at 50° C. for several hours. The product is 100% mordenite.

Another cheap zeolitic type material that can be utilized as a sacrificial trap for metals, in particular vanadium, is the interlayered clays (smectite type minerals). The layered naturally occurring and synthetic smectites include, bentonite, montmorillonites and chlorites. These clays can be visualized as a "sandwich" comprising two outer layers of silicon tetrahedra and an inner layer of alumina octahedra. These platelets are stacked one upon the other and yield a repeating structure about every nine Å. They can be separated by polar molecules by as much as 30-40Å. However, these platelets will collapse when subjected to elevated temperatures. These layered clays can be prepared from synthetic solutions of silica, alumina and magnesium and/or lithium and/or fluoride ions. These preparations are described in U.S. Pat. Nos. 3,803,026; 3,892,655; 3,275,757; 3,586,478 and are incorporated herein by reference. However, based upon availability and lower prices, the naturally occurring clays will be utilized in the preparation of pillared interlayered clays (PILC). The PILC may be prepared as described in U.S. Pat. Nos. 4,176,090 and 4,248,739 which patents are incorporated herein by reference. A clay slurry is prepared from a natural clay product designated Volclay 200 by the American Colloid Co. A total of 3,200 ml. of a clay slurry containing 2.7 percent solids is mixed with 111 grams of an aluminum chlorohydroxide solution containing 50 weight percent of the salt. The resulting mixture is aged for one-half hour with agitation and the temperature is increased to 160° F. The slurry is then aged for one-half hour at 160° F. The product is then filtered, washed with hot deionized water, reslurried in deionized water and spray dried employing procedures and equipment described elsewhere in this patent. This will yield a product having surface areas greater than 400 $m^2$/g with an average pore diameter (platelet separation) of approximately 19A.

The sacrificial trap materials contemplated by the invention can be ion-exchanged with ammonium and/or the metal additive ions of the invention to displaced sodium. The procedures and techniques for exchanging ammonium and/or metal ions are described in U.S. Pat. Nos. 3,402,996 and 4,125,591, which patents are incorporated herein by reference.

The following are examples of displacing sodium by ion exchanging. 800 grams of a sacrificial zeolitic trap (containing up to 15 wt% $Na_2O$) is slurried into 6500 ml. of water, and an excess amount (1.1 times the theoretical amount to exchange all of the sodium on the sacrificial zeolitic trap) of the metal additive of the invention as a water soluble salt is added to the sacrificial trap slurry. This slurry is mixed for 30 minutes at 45°–180° C., and the slurry is filtered and washed with 12,000 ml. of water. This procedure removes 40–75% of the sodium ion from the sacrificial trap. This procedure can be repeated one or more times.

800 grams of a sacrificial zeolitic trap (containing up to 15 wt% sodium as $Na_2O$) is slurried into 6500 ml. of water and 1200 grams of ammonium sulfate is added with stirring. The slurry is treated for one hour and the exchanged trap is filtered, washed and dried. This procedure removes 60–80% of the sodium ion from the sacrificial trap.

This type of metal exchange with the sacrificial zeolitic traps of the invention can be practiced with the metals covered in Table A. These metal containing sieves may not only serve as traps or sacrificial sieves but when carrying metals other than ammonium ion may additionally immobilize vanadium by springing loose the ion exchanged metal to form a metal vanadate complex. This is illustrated by the reaction of Calcium A sieve with vanadia to yield a vanadium containing A sieve and calcium vanadate (melting point above 1800° F.).

EXAMPLES OF SACRIFICIAL TRAPS IN MATRIX

As one preferred embodiment of the invention, the sacrificial trap material may be incorporated directly into the matrix material. To an aqueous slurry of the raw matrix material and a catalytically active zeolite is mixed the sacrificial trap material in an amount to yield approximately 1 to 40 wt% concentration on the finished catalyst. These sacrificial zeolitic traps are usually crystallized as regular and/or irregularly shaped, discrete particles of approximately 0.1 to 10 microns in size and, accordingly, this is the size range normally provided by synthetic means. This mixture may be spray dried to yield the finished catalyst as a microspherical particle of 10 to 200 microns in size with the sacrificial metal trap deposited within the matrix and/or on the outer surface of the catalyst particle. Since the concentration of vanadium on spent catalyst can be as high as 4 wt% of particle weight, the concentration of sacrificial trap is preferably in the range of 1 to 40 wt%. More preferably, there is sufficient sacrificial trap to maintain at least the preferred ratio of sacrificial trap to vanadium at all times.

The catalytically active zeolites and/or the sacrificial trap can be suitably dispersed in the matrix materials for use as cracking catalysts by methods well-known in the art, such as those disclosed, for example, in U.S. Pat. Nos. 3,140,249 and 3,140,253 to Plank, et al.; U.S. Pat. No. 3,660,274 to Blazek, et al.; U.S. Pat. No. 4,010,116 to Secor, et al.; U.S. Pat. No. 3,944,482 to Mitchell, et al.; and U.S. Pat. No. 4,079,019 to Scherzer, et al; which patents are incorporated herein by reference.

After introduction of the catalytically active zeolite and/or sacrificial trap, the composition is preferably slurried and spray dried to form catalyst microspheres. The particle size of the spray dried matrix is generally in the range of about 10 to 200 microns, preferably 20 to 150 microns, more preferably 40 to 80 microns. The finished catalyst should contain from 5 to 50% by weight of the catalytically active zeolite, preferably rare earth or ammonia exchanged sieve of either or both the X and Y variety and preferably about 15 to 45% by weight, most preferably 20 to 40% by weight, in addition 1–40% by weight of sacrificial trap. To further enhance the catalyst, rare earth exchanged sieve may be calcined and further exchanged with rare earth or ammonia to create an exceptionally stable sieve.

The following is one example of a spray dryable composition. A silica sol component is prepared by mixing sodium silicate with water and rapidly mixing with acid to provide a sol which comprises from about 0.5 to 0.6% by weight $Na_2O$ and sufficient acid to provide a pH of between about 0.5 to 3.3 and preferably of between 1.0 and 3.0. Typically, the sol is prepared by combining commercially available 40° Baume 3.25 $Na_2O \cdot SiO_2$ solution with sulfuric acid solution having a concentration of 9 to 36% by weight $H_2SO_4$. Optionally, the sol may be combined with from about 15 to 45% by weight total solids and the remainder water. The sacrificial trap may be added to this sol and/or to the zeolite slurry component below.

A basic zeolite slurry component is then made up by mixing the desired quantities of zeolite in the sodium form with a sufficient quantity of sodium silicate solution (typically 40° Baume) and water to give a product having the desired pH. Clay may be added to the basic zeolite slurry component if desired. The pH of the zeolite slurry component is maintained above about 10 and preferably at between 10.5 and 14. The slurry component will contain from about 10 to 17% by weight sodium silicate, from about 10 to 17% by weight zeolite and optionally from about 15 to 40% by weight clay and the balance water. The total solids content of the zeolite containing basic slurry ranges from about 33 to 46% by weight.

In the next step of this process, the two streams are mixed instantaneously and homogeneously in amounts such from about 1.5 to 7.5 parts by weight of the above defined sol component is mixed with each part by weight of the zeolite-sacrificial trap slurry component. The mixture is immediately atomized, i.e. sprayed, into a heated gaseous atmosphere, such as air and/or steam having a temperature of 25° to 300° F., using a commercially available spray drier. A water slurry of the spray formed microspherical particles has a pH of about 3.0 to 10.0.

It is critical to successful operation of this process that the mixing and subsequent spraying take place rapidly to prevent premature setting of the gel. The air atomizer used should feed the two components into the nozzle at pressures of about 90 to 150 psi and maintain the air in the nozzle at about 80 to 90 psi, preferably about 81–83 psi. As an alternative to premixing with either component, the sacrificial trap may also be fed separately to the nozzle via a separate line operated at pressures of about 90 to 150 psi.

EXAMPLE OF SACRIFICIAL TRAP CATALYST 20 l. of tap water were placed in a homogenizing mill with 2 l. of "N" brand sodium meta silicate and mixed for five minutes. An acid solution was prepared by adding 0.175 l. of concentrated sulfuric acid to 5 l. of tap water. The acid solution was added to the slurry in the mill over a ten minute period with stirring. During this period, the temperature was raised to 100° F. while stirring till a gel formed. After gel formation, the gel was aged for 30 minutes at 100° F.

1.74 kg. of aluminum sulfate was added to 3 l. of tap water and mixed till complete solubilization was obtained. The aluminum sulfate solution was added to the gel in the mill with stirring over a five minute period and held at 100° F. for 15 minutes. At this time, the pH of the slurry was increased to approximately 6 by adding 0.8 l. of concentrated ammonium hydroxide with vigorous stirring.

0.785 kg. of Calcium A zeolite was dispersed into three liters of water and divided into three equal portions. Each portion was added to gel slurry over a five minute period with mixing and the temperature was maintained at 110° F.

1.244 kg. of NaY zeolite was dispersed into three liters of water and divided into three equal portions. Each portion was added to the CaA-matrix slurry with mixing over a five minute period while the temperature was maintained at 110° F.

The resulting slurry of CaA-NaY-matrix material was spray dried. The inlet temperature was 400° C. and the outlet temperature 120° C. 1 kilogram of the resulting microspheres from spray drying was washed three times with 10 l. of tap water at 130° F. The washed microspheres were then exchanged with a calcium chloride solution that contained 0.150 kg. of calcium chloride in 10 l. of water. This exchange took place over a 15 minute period at 150° F. The resulting microspheres were then exchanged with a rare earth chloride solution. The rare earth chloride solution was prepared by adding sufficient rare earth chlorides to 10 l. of water to prepare a 0.1N solution. The microspheres were exchanged with the rare earth chloride solution for 15 minutes at 150° F. The calcium-rare earth exchanged microspheres were then washed four times with 10 l. of 130° F. water for 15 minutes on each wash. The catalyst was then dried by heating from room temperature to 1,000° F. and held at 1,000° F. for one hour. The exchanged-calcined catalyst was exchanged a second time with 10 l. of a 0.1N rare earth chloride solution at 150° F. for 15 minutes. The second exchanged catalyst was washed and dried at 300° F. for three hours.

75 grams of the CaA-rare earth exchanged catalyst was calcined according to the CIS metal torture method (Table D). Employing a vacuum impregnation technique, vanadium naphthenate was utilized to prepare catalyst samples containing 0, 0.5 and 0.75 wt% vanadium on the catalyst. Nickel octoate was utilized in a similar manner to prepare 0, 1.0 and 2.0 wt% nickel containing catalysts.

The select catalysts of this invention include solids of high catalytic activity such as catalytically active zeolites in a matrix of clays, kaolin, silica, alumina, silica-alumina, and the like, and containing sacrificial zeolitic metal traps. The surface area of these catalysts are preferably above 100 m²/g and they have a pore volume preferably in excess of 0.2 cc/g and a micro-activity (MAT) value in volume percent conversion as measured by ASTM Test Method No. D-3907-80 of at least 60, and preferably in the range of 65–90.

In general, it is preferred to employ a catalyst having a relatively high level of cracking activity, providing high levels of conversion and selectivity at low residence times. The conversion capabilities of the catalyst may be expressed in terms of the conversion produced during actual operation of the process and/or in terms of conversion produced in standard catalyst activity tests.

For example, it is preferred to employ a catalyst which, in the course of extended operation under prevailing process conditions is sufficiently active for sustaining a level of conversion of at least about 50% and more preferably at least about 60%. In this connection, conversion is expressed in liquid volume percent based on fresh feed.

Also, for example, the preferred catalyst may be defined as one which, in its virgin or equilibrium state, exhibits a specified activity expressed as a percentage in terms of MAT (micro-activity test) conversion. For purposes of the present invention, the foregoing percentage is the volume percentage of standard feedstock which a catalyst under evaluation will convert to 430° F. end point gasoline, lighter products and coke at 900° F., 16 WHSV (weight hourly space velocity calculated on a moisture free basis using clean catalyst which has been dried at 1100° F., weighed and then conditioned for a period of at least 8 hours at about 25° C. and 50% relative humidity, until about one hour or less prior to contacting the feed), and 3 C/O (catalyst to oil weight ratio) by ASTM D-32 MAT test D-3907-80, using an appropriate standard feedstock, e.g. a sweet light primary gas oil, defined as follows:

| | |
|---|---|
| API Gravity at 60° F., degrees | 31.0 |
| Specific Gravity at 60° F., g/cc | 0.8708 |
| Ramsbottom Carbon, wt % | 0.09 |
| Conradson Carbon, wt % (est.) | 0.04 |
| Carbon, wt % | 84.92 |
| Hydrogen, wt % | 12.94 |
| Sulfur, wt % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffins, Vol % | 31.7 |
| Olefins, Vol % | 1.8 |
| Naphthenes, Vol % | 44.0 |
| Aromatics, Vol % | 22.7 |
| Average Molecular Weight | 284 |
| Nickel | Trace |
| Vanadium | Trace |
| Iron | Trace |
| Sodium | Trace |
| Chlorides | Trace |
| BS & W | Trace |
| Distillation | ASTM D-1160 |
| IBP | 445 |
| 10% | 601 |
| 30% | 664 |
| 50% | 701 |
| 70% | 734 |
| 90% | 787 |
| FBP | 834 |

The gasoline end point and boiling temperature-volume percent relationships of the products produced in the MAT conversion test may for example be determined by simulated distillation techniques, for example by modification of the gas chromatographic "Sim-D"

technique of ASTM D-2887-73. The results of such simulations are in reasonable agreement with the results obtained by subjecting larger samples of material to standard laboratory distillation techniques. Conversion is calculated by subtracting from 100 the volume percent (based on fresh feed) of those products heavier than gasoline which remain in the recovered product.

On pages 935–937 of Hougen and Watson, "Chemical Process Principles", John Wiley & Sons, Inc., NY. (1947), the concept of "Activity Factors" is discussed. This concept leads to the use of an operating catalyst against a standard catalyst. Relative activity measurements facilitate recognition of how the quality requirements of various catalysts differ from one another. Thus, relative activity is a ratio obtained by dividing the weight of a standard or reference catalyst which is or would be required to produce a given level of conversion, as compared to the weight of an operating catalyst (whether proposed or actually used) which is or would be required to product the same level of conversion in the same or equivalent feedstock under the same or equivalent conditions. Said ratio of catalyst weights may be expressed as a numerical ratio, but preferably is converted to a percentage basis.

The standard catalyst is preferably chosen from among catalysts useful for conducting the present invention, such as for example, zeolite fluid cracking catalysts, and is chosen for its ability to produce a predetermined level of conversion in a standard feed under the conditions of temperature, WHSV, catalyst to oil ratio and other conditions set forth in the preceding description of the MAT conversion test and in ASTM D-32 MAT test D-3907-80. Conversion is the volume percentage of feedstock that is converted to 430° F. endpoint gasoline, lighter products and coke. For standard feed, one may employ the above-mentioned light primary gas oil, or equivalent.

For purposes of conducting relative activity determinations, one may prepare a "standard catalyst curve", a chart or graph of conversion (as above defined) vs. reciprocal WHSV for the standard catalyst and feedstock. A sufficient number of runs is made under ASTM D-3907-80 conditions (as modified above) using standard feedstock at varying levels of WHSV to prepare an accurate "curve" of conversion vs. WHSV for the standard feedstock. This curve should traverse all or substantially all of the various levels of conversion including the range of conversion within which it is expected that the operating catalyst will be tested. From this curve, one may establish a standard WHSV for test comparisons and a standard value of reciprocal WHSV corresponding to that level of conversion which has been chosen to represent 100% relative activity in the standard catalyst. For purposes of the present disclosure the aforementioned reciprocal WHSV and level of conversion are, respectively, 0.0625 and 75%. In testing an operating catalyst of unknown relative activity, one conducts a sufficient number of runs with that catalyst under D-3907-80 conditions (as modified above) to establish the level of conversion which is or would be produced with the operating catalyst at standard reciprocal WHSV.

Figure 10:
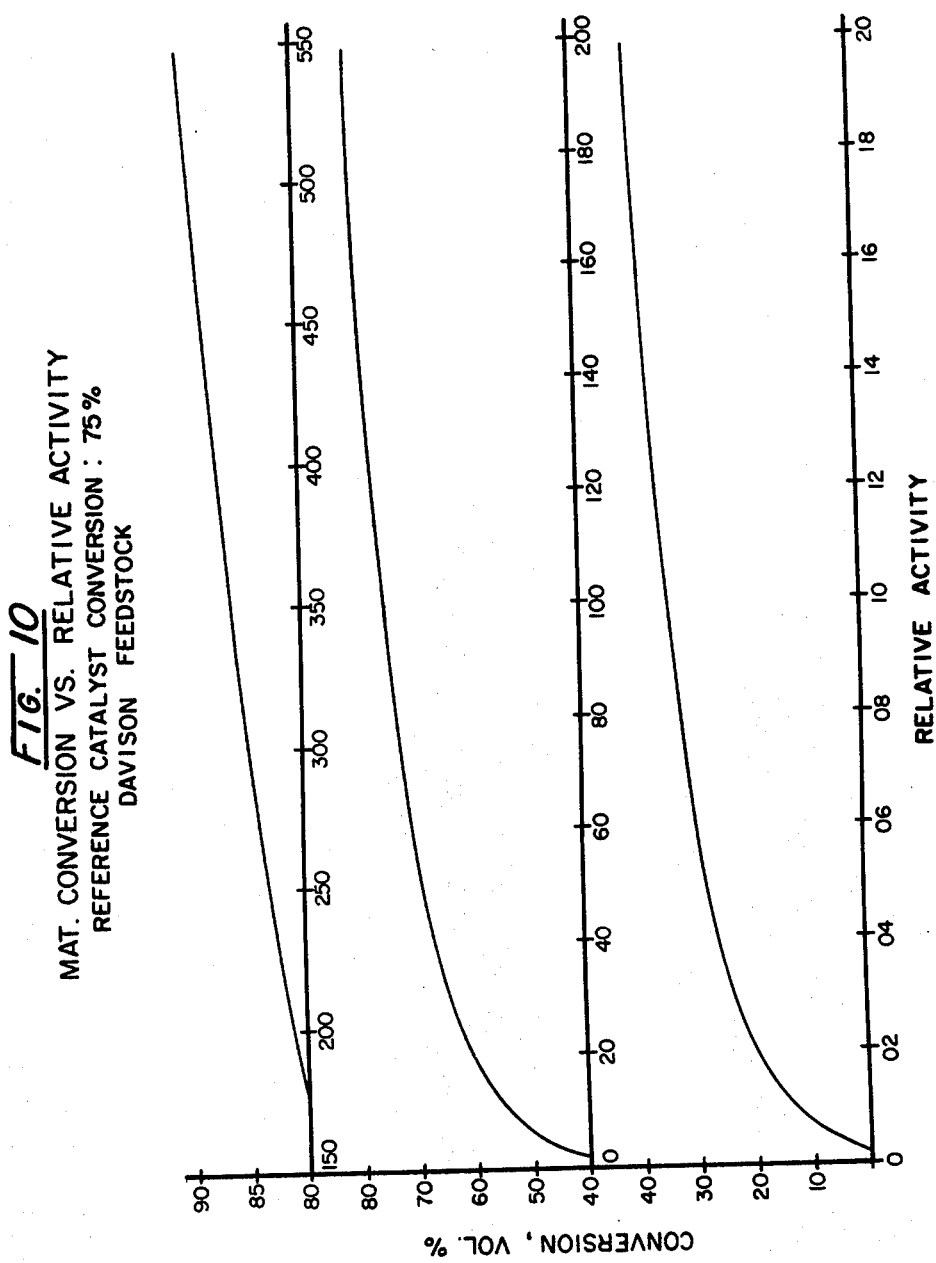
FIG. 10 is a graph showing the change in catalyst relative activity with changing vol.% MAT conversion.

Then, using the above-mentioned standard catalyst curve, one establishes a hypothetical reciprocal WHSV constituting the reciprocal WHSV which would have been required, using the standard catalyst, to obtain the same level of conversion which was or would be exhibited by the operating catalyst at standard WHSV. The relative activity may then be calculated by dividing the hypothetical reciprocal WHSV of the standard catalyst by the actual reciprocal WHSV of the test catalyst. The result is relative activity expressed in terms of a decimal fraction, which may then be multiplied by 100 to convert to % relative activity (relative activity may also be expressed as follows: relative activity at constant conversion is equal to the ratio of the WHSV of the test catalyst divided by the WHSV of the standard catalyst). To simplify this calculation, a MAT conversion vs. relative activity curve was developed utilizing a standard catalyst of 75 vol% conversion to represent 100% relative activity. One such curve is shown in FIG. 10. In applying the results of this determination a relative activity of 0.5, or 50%, means that it would take twice the amount of the operating catalyst to give the same conversion as the standard catalyst, i.e., the production catalyst is 50% as active as the reference catalyst.

The catalyst may be introduced into the process in its virgin form or, as previously indicated, in other than its virgin; e.g., one may use equilibrium catalyst withdrawn from another unit, such as catalyst that has been employed in the cracking of a different feed. Whether characterized on the basis of MAT activity or relative activity, the preferred catalysts may be described on the basis of their activity "as introduced" into the process of the present invention, or on the basis of their "as withdrawn" or equilibrium activity in the process of the present invention, or on both of these bases.

A preferred activity level of virgin and non-virgin catalyst "as introduced" into the process of the present invention is at least about 60% by MAT conversion and preferably at least about 20%, more preferably at least about 40% and still more preferably at least about 60% in terms of relative activity. However, it will be appreciated that, particularly in the case of non-virgin catalysts supplied at high addition rates, lower activity levels may be acceptable. An acceptable "as withdrawn" or equilibrium activity level of catalysts which has been used in the process of the present invention is at least about 20% or more, but about 40% or more and preferably about 60% or more is preferred on a relative activity basis, and an activity level of 60% or more on a MAT conversion basis is also contemplated. More preferably, it is desired to employ a catalyst which will, under the conditions of use in the unit, establish an equilibrium activity at or above the indicated level. The catalyst activities are determined with catalyst having less than 0.01 wt% coke, e.g. regenerated catalyst.

Representative feedstocks contemplated for use with the invention include whole crude oils; light fractions of crude oils such as light gas oils, heavy gas oils, and vacuum gas oils; and heavy fractions of crude oils such as topped crude, reduced crude, vacuum fractionator bottoms, other fractions containing heavy residua, coal-derived oils, shale oils, waxes, untreated or deasphalted residua, and blends of such fractions with gas oils and the like. A high vanadium feed for FCC processing is one having more than 0.1 ppm vanadium, preferably 1.0 to 5.0 ppm where a relatively small amount of reduced crude (5–25%) is mixed with VGO to provide an FCC feedstock. A high vanadium feed for RCC processing is one having more than 1.0 ppm vanadium, preferably more than about 5.0 ppm. In either case, the preferred weight ratio of vanadium to nickel in feed without additive nickel is in the range of from about 1:3 to 5:1, more preferably greater than about 1:1.

The metal trapping and/or vanadia immobilization catalysts and/or methods described in this specification are preferably employed in combination with the processes and apparatuses for carbometallic oil conversion described in co-pending U.S. application Ser. Nos. 94,091; now U.S. Pat. No. 4,299,687 94,092; now U.S. Pat. No. 4,332,673 94,216; now U.S. Pat. No. 4,341,624 94,217; now U.S. Pat. No. 4,347,122 and 94,227; now U.S. Pat. No. 4,354,923 each of said co-pending applications having been filed on Nov. 14, 1979, and being expressly incorporated herein by reference. The sacrificial zeolite metal traps of the present invention may be used in combination with the sorbents and catalysts described in the pending applications of Ashland Oil Inc. identified as International Application numbers PCT-US81-00356 now pending and PCT-US81-00357 now pending U.S. patent applications Ser. Nos. 277,751 and 277,752 respectively, which applications are also incorporated herein by reference. The preferred feeds capable of being cracked by these methods and apparatuses are comprised of 100% or less of 650° F.+material of which at least 5 wt%, preferably at least 10 wt%, does not boil below about 1025° F. The terms "high molecular weight" and/or "heavy" hydrocarbons refer to those hydrocarbon fractions having a normal boiling point of at least 1025° F. and include non-boiling hydrocarbons, i.e., those materials which may not boil under any conditions.

A carbo-metallic feed for purposes of this invention is one having a heavy metal content of at least about 4 ppm nickel equivalents (ppm total metals being converted to nickel equivalents by the formula: Ni eq.=Ni+V/4.8+Fe/7.1+Cu/1.23), a Conradson carbon residue value greater than about 1.0, and a vanadium content of at least 1.0 ppm. The feedstocks for which the invention is particularly useful will have a heavy metal content of at least about 5 ppm nickel equivalents, a vanadium content of at least 2.0 ppm, and a Conradson residue of at least about 2.0. The greater the heavy metal content and the greater the proportion of vanadium in that heavy metal content, the more advantageous the sacrificial traps and processes of this invention becomes. A particularly preferred feedstock for treatment by the process of the invention includes a reduced crude comprising 70% or more of a 650° F.+material having a fraction greater than 20% boiling about 1025° F. at atmospheric pressure, a metals content of greater than 5.5 ppm nickel equivalents of which at least 5 ppm is vanadium, a vanadium to nickel atomic ratio of at least 1.0, and a Conradson carbon residue greater than 4.0. This feed may also have a hydrogen to carbon ratio of less than about 1.8 and coke precursors in an amount sufficient to yield about 4 to 14% coke by weight based on fresh feed. The feed is preferably pretreated to remove sodium to a level less than 1 ppm.

Sodium vanadates have low melting points and may also flow and destroy the crystalline zeolites in the same manner as vanadium pentoxide. Although it is desirable to maintain low sodium levels in the feed in order to minimize neutralization of acid sites, as well as to avoid sodium vanadates on the catalyst, the sacrificial traps of the present invention are also effective in forming compounds, alloys, or complexes with sodium vanadates so as to prevent these compounds from destroying the zeolite.

With respect to the tolerance levels of heavy metals on the catalyst itself, such metals may accumulate on an FCC catalyst to levels in the range of 100 to 10,000 ppm total metals, preferably 500–5,000 ppm, of which 5 to 100%, preferably 20 to 80%, is vanadium. Such metals may accumulate on RCC catalysts to levels in the range of from about 3,000 to about 70,000 ppm of total metals, preferably 10,000 to 30,000 ppm, of which 5 to 100%, preferably 20 to 80% is vanadium.

The feed may contain nickel in controlled amounts so that the oxides of nickel may help tie up vanadium pentoxide in a high melting complex, compound or alloy. The invention therefore contemplates controlling the amounts of nickel in the feed by introducing nickel additives or feedstocks with high nickel to vanadium ratios so that the compounds of this metal, either alone or in combination with other additives, comprise the metal additive of the invention. Similarly, a nickel containing catalyst may also be made by first using virgin catalyst, containing a sacrificial trap, in a conversion process employing a feedstock with a high nickel to vanadium ratio; and then using the resulting equilibrium catalyst as make-up catalyst in the process of the present invention. In these embodiments, the atomic ratio of nickel to vanadium on the catalyst should be greater than 1.0, preferably at least about 1.5.

The cracking reaction according to the methods disclosed in the above co-pending applications (Ashland's RCC processes) is sufficiently severe to convert 50 to 90 percent of the carbo-metallic oil feed to gasoline per pass and produce coke in amounts of 4 to 14 percent by weight based on weight of fresh feed. This coke is laid down on the catalyst in amounts in the range of about 0.3 to 3 percent by weight of catalyst, depending upon the catalyst to oil ratio (weight of catalyst to weight of feedstock) in the riser.

The feed, with or without pretreatment, is introduced as shown in FIG. 1 into the bottom of the riser along with a suspension of hot cracking catalyst prepared in accordance with this invention. Steam, naphtha, water, flue gas and/or some other diluent is preferably introduced into the riser along with the feed. These diluents may be from a fresh source or may be recycled from a process stream in the refinery. Where recycle diluent streams are used, they may contain hydrogen sulfide and other sulfur compounds which may help passivate adverse catalytic activity by heavy metals accumulating on the catalyst. It is to be understood that water diluents may be introduced either as a liquid or as steam. Water is added primarily as a source of vapor for dispersing the feed and accelerating the feed and catalyst to achieve the vapor velocity and residence time desired. Other diluents as such need not be added but where used, the total amount of diluent specified includes the amount of water used. Extra diluent would further increase the vapor velocity and further lower the feed partial pressure in the riser.

As the feed travels up the riser, it is catalytically cracked to form basically five products known in the industry as dry gas, wet gas, cat naptha, light cycle oil, heavy cycle oil and/or slurry oil. At the upper end of the riser, the catalyst particles are ballistically separated from product vapors as previously described. The catalyst which then contains the coke formed in the riser is sent to the regenerator to burn off the coke and the separated product vapors are sent to a fractionator for further separation and treatment to provide the five basic products indicated.

The invention may be utilized in FCC processes. Preferred riser conditions for an FCC process employing the invention are summarized in Table C-1. The preferred conditions for the riser conversion reaction for an RCC processor employing this invention are summarized in Table C-2. In these tables, the abbreviations used have the following meanings: "Temp." for temperature, "Dil." for diluent, "pp" for partial pressure, "wgt" for weight, "V" for vapor, "Res." for residence, "C/O" for catalyst to oil ratio, "Cat." for catalyst, "bbl" for barrel, "MAT" for microactivity by the MAT test using a standard feedstock, "Vel." for velocity, "cge" for charge, "d" for density and "Reg." for regenerated.

TABLE C-1
FCC RISER CONDITIONS

| Parameter | Broad Operating Range | Preferred Range |
|---|---|---|
| Feed Temp. | 400–800° F. | 400–650° F. |
| Steam Temp. | 200–500° F. | 300–400° F. |
| Reg. Catalyst Temp. | 1000–1400° F. | 1175–1350° F. |
| Riser Exit Temp. | 900–1200° F. | 925–1050° F. |
| Pressure | 0–100 psia | 10–50 psia |
| Water/Feed | 0.01–0.15 | 0.01–0.10 |
| Dil. pp/Feed pp | 0.15–2.0 | 1.25–1.0 |
| Dil. wgt/Feed wgt | ≦0.2 | 0.01–0.1 |
| V. Res. Time | 0.1–5 | 0.5–3 sec. |
| C/O, wgt. | 4–12 | 5–10 |
| Lbs. Cat./bbl Feed | 0.01–2.0 | 0.05–1 |
| Inlet Cat. MAT | >60 vol. % | 70–85 |
| Outlet Cat. MAT | ≧55 vol. % | ≧65 |
| V. Vel. | 25–90 ft./sec. | 30–60 |
| V. Vel./Sorb. Vel. | ≧1.0 | 1.2–2.0 |
| Dil. Cge. Vel | 5–90 ft./sec. | 10–50 |
| Oil Cge. Vel. | 1–50 ft./sec. | 5–50 |
| Inlet cat. d | 1–9 lbs./ft.$^3$ | 2–6 |
| Outlet Cat. d | 1–6 lbs./ft.$^3$ | 1–3 |

TABLE C-2
RCC RISER CONDITIONS

| Parameter | Broad Operating Range | Preferred Range |
|---|---|---|
| Feed Temp. | 400–800° F. | 400–650° F. |
| Steam Temp. | 20–500° F. | 300–400° F. |
| Reg. Catalyst Temp. | 1100–1500° F. | 1275–1450° F. |
| Riser Exit Temp. | 900–1400° F. | 950–1100° F. |
| Pressure | 0–100 psia | 10–50 psia |
| Water/Feed | 0.05–0.30 | 0.05–0.15 |
| Dil. pp/Feed pp | 0.25–3.0 | 1.0–2.5 |
| Dil. wgt/Feed wgt | ≦0.4 | 0.1–0.3 |
| V. Res. Time | 0.1–5 | 0.5–3 sec. |
| C/O, wgt. | 3–18 | 5–12 |
| Lbs. Cat./bbl Feed | 0.1–4.0 | 0.2–2.0 |
| Inlet Cat. MAT | >50 vol. % | >60 |
| Outlet Cat. MAT | >20 vol. % | ≧40 |
| V. Vel. | 25–90 ft./sec. | 30–60 |
| V. Vel./Cat. Vel. | ≧1.0 | 1.2–2.0 |
| Dil. Cge. Vel | 5–90 ft./sec. | 10–50 |
| Oil Cge. Vel. | 1–50 ft./sec. | 5–50 |
| Inlet cat. d | 1–9 lbs./ft.$^3$ | 2–6 |
| Outlet cat. d | 1–6 lbs./ft.$^3$ | 1–3 |

In cracking carbo-metallic feedstocks as herein discussed, the regenerating gas may be any gas which can provide oxygen to convert carbon to carbon oxides. Air is highly suitable for this purpose in view of its ready availability. The amount of air required per pound of coke for combustion depends upon the desired carbon dioxide to carbon monoxide ratio in the effluent gases and upon the amount of other combustible materials present in the coke, such as hydrogen, sulfur, nitrogen and other elements capable of forming gaseous oxides at regenerator conditions.

The regenerator is operated at temperatures in the range of about 1000° to 1600° F., preferably 1275° to 1450° F., to achieve adequate combustion while keeping catalyst temperatures below those at which significant catalyst degradation can occur. In order to control these temperatures, it is necessary to control the rate of burning which in turn can be controlled at least in part by the relative amounts of oxidizing gas and carbon introduced into the regeneration zone per unit time. With reference to FIG. 1, the rate of introducing carbon into the regenerator may be controlled by regulating the rate of flow of coked catalyst through valve 40 in conduit 39, the rate of removal of regenerated catalyst by regulating valve 41 in conduit 16, and the rate of introducing oxidizing gas by the speed of operation of blowers (not shown) supplying air to the conduit 14. These parameters may be regulated such that the ratio of carbon dioxide to carbon monoxide in the effluent gases is equal to or less than about 4.0, preferably about 1.5 or less. In addition, water, either as liquid or steam, may be added to the regenerator to help control temperatures and to influence the carbon dioxide to carbon monoxide ratio.

The regenerator combustion reaction is carried out so that the amount of carbon remaining on regenerated catalyst is less than about 0.25, preferably less than about 0.05 percent on a substantially moisture-free weight basis. The residual carbon level is ascertained by conventional techniques which include drying the catalyst at 1100° F. for about four hours before actually measuring the carbon content so that the carbon level obtained is on a moisture-free basis.

The catalyst of this invention with the sacrificial trap and/or metal exchanged sacrificial trap is charged to a FCC unit of the type outlined in FIG. 1 or to a Reduced Crude Conversion (RCC) unit of the type disclosed in Ashland's RCC applications identified above. Catalyst particle circulation and operating parameters are brought up to process conditions by methods well-known to those skilled in the art. The equilibrium catalyst at a temperature of 1100°–1500° F. contacts the oil feed at riser wye 17. The feed can contain steam and/or flue gas injected at point 2 or water and/or naphtha injected at point 3 to aid in feed vaporization, catalyst fluidization and controlling contact time in riser 4. The catalyst and vaporous hydrocarbons travel up riser 4 at a contact time of 0.1–5 seconds, preferably 0.5–3 seconds. The catalyst and vaporous hydrocarbons are separated in vented riser outlet 6 at a final reaction temperature of 900°–1100° F. The vaporous hydrocarbons are transferred to a multistage cyclone 7 where any entrained catalyst fines are separated and the hydrocarbon vapors are sent to a fractionator (not shown) via transfer line 8. The coked catalyst is then transferred to stripper 10 for removal of entrained hydrocarbon vapors and then to regenerator vessel 11 to form a dense fluidized bed 12. An oxygen containing gas such as air is admitted to the bottom of dense bed 12 in vessel 11 to combust the coke to carbon oxides. The resulting flue gas is processed through cyclones 22 and exits from regenerator vessel 11 via line 23. The regenerated catalyst is transferred to stripper 15 to remove any entrained combustion gases and then transferred to riser wye 17 via line 16 to repeat the cycle.

At such time that the metal level on the catalyst becomes intolerably high such that catalyst activity and selectivity declines, additional catalyst can be added and deactivated catalyst withdrawn at addition-withdrawal point 18 into the dense bed 12 of regenerator 11 and/or at addition-withdrawal point 19 into regenerated catalyst standpipe 16. Addition-withdrawal points 18 and 19 can be utilized to add virgin catalysts containing one or more sacrificial traps of the invention.

SACRIFICIAL TRAP ADDITION TO PROCESS

Figure 11:
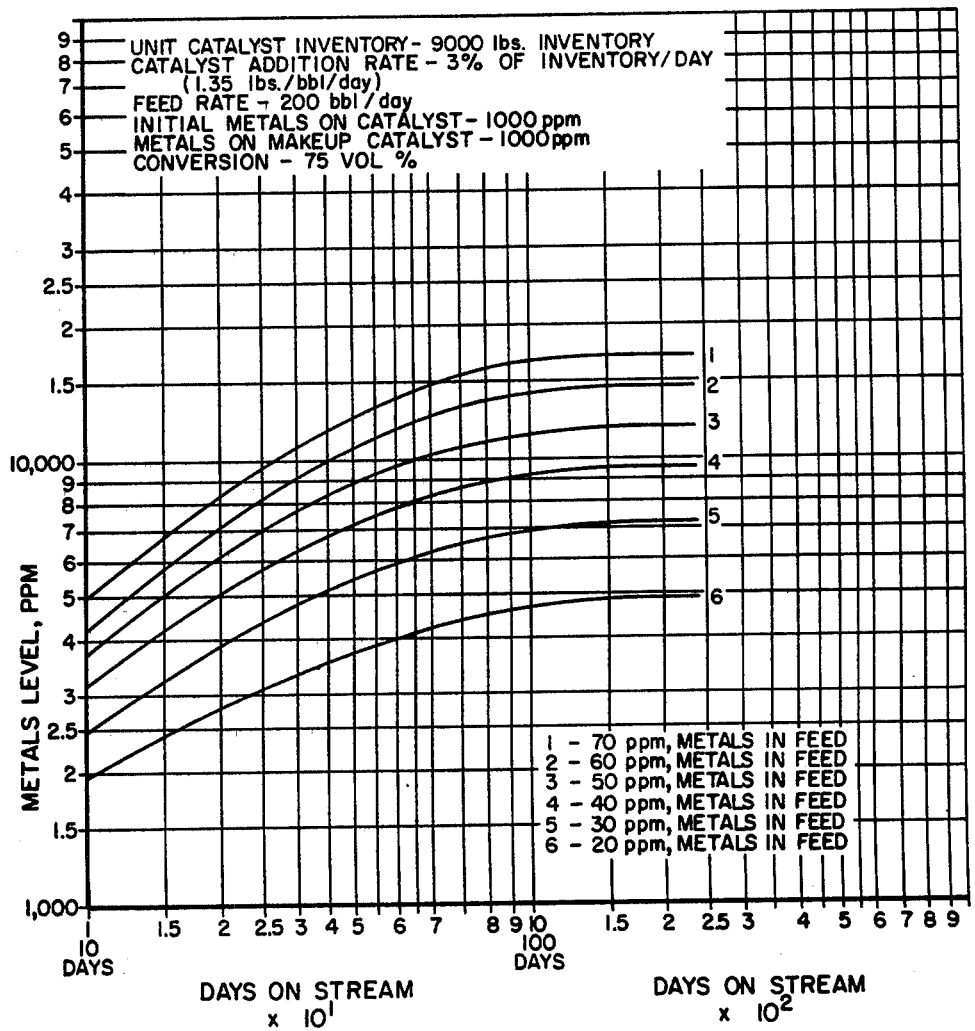
FIG. 11 is a graph showing the time required to build up metals on a catalyst at varying metals levels in feed and a catalyst addition rate of 3% of inventory.

In a FCC or RCC unit, the rate of metals buildup on the circulating catalyst is a function of metals in the feed, the catalyst circulating inventory, the catalyst addition and withdrawal rates (equal), and the catalyst to oil ratio. FIGS. 11 and 12 give the rate of metal buildup on a circulating catalyst at constant inventory, constant catalyst addition and withdrawal rate and varying metals content in the feed. These figures show that for feed metals levels of 20-70 ppm, total metal levels on the catalyst equilibrate after about 90-150 days. Thereafter, the metals level on catalyst remained constant with time. By utilizing these figures, or similar figures that can be developed for higher metals levels, higher addition rates and higher circulating inventories, the required concentrations of the sacrificial trap of this invention on the catalyst can be calculated. For example, in FIG. 11, the unit has 9,000 lbs. of catalyst inventory, a catalyst addition rate of 1.35 lb./bbl. of feed per day, and a feed rate of 200 lb./day. Assuming the metals content is all vanadium, Curve 1 in FIG. 11 would be utilized to show total vanadium after 150 days of continuous operation with 70 ppm vanadium in the feed, reaches about 17,000 ppm and then remains constant with time. Thus, in making a catalyst containing a sacrificial trap according to this invention, the catalyst would be prepared such that it would contain at least 17 wt% sacrificial trap to ensure at least a 10 to 1 ratio of sacrificial trap to vanadium was maintained at equilibrium conditions. Similar calculations can be performed for lower and higher equilibrium vanadium values using the other curves or multiples of those curves (120 ppm metals on catalyst would equilibrate at about 30,000 ppm under the conditions of FIG. 11).

In processing feeds of varying vanadium content, the rate of vanadium buildup on the catalyst and the equilibrium or steady state of vanadium on the catalyst is a function of vanadium content of the feed and especially the catalyst addition and withdrawal rates which are equal to equilibrium conditions. Table E presents a typical case for a 40,000 bbl/day unit in which the vanadium content of the feed is varied from 1 ppm (FCC operations with VGO containing 5-20% of a heavy hydrocarbon fraction) up to 25-400 ppm (RCC operations). In order to maintain various levels of vanadium on the catalyst at the equilibrium state after long term operation (50-150 days), the catalyst addition rate can be varied to yield equilibrium vanadium values of from 5,000 to 30,000 ppm. As stated and explained elsewhere, vanadium, as vanadium pentoxide on the catalyst, causes irreversible zeolite destruction and especially manifests this phenomena at the higher vanadium levels. For example, at 5,000 ppm vanadium, the zeolite content can be reduced by at least 50%, and at 10,000 ppm, complete destruction of the zeolite crystalline structure may occur. By applying the sacrificial traps of this invention, one can now operate in the upper ranges of vanadium levels (20,000-30,000 ppm) without the vanadium destroying the catalytically active zeolite and causing particle coalescence.

Table F presents the economic advantage of introducing the sacrificial trap material of this invention into a reduced crude or FCC operation. Table F shows the economic differential (savings in $/day) that can be realized by utilizing the sacrificial traps of this invention and operating at the 20,000 ppm level versus the 10,000 ppm level of vanadium. These savings can be higher by a factor of about two (2) if one considers operation at the 5,000 ppm level versus the 20,000 ppm level of vanadium. A cheaper sacrificial trap will also improve these economics. Thus, whereas mordenite costs as high as $2/lb., A sieves can cost as low as $1.50/lb. and naturally occurring zeolite as low as $0.50-$1.00.

As shown in Table F, a FCC operation (1 ppm vanadium in feed) would show a savings of at least $390/day with a sacrificial trap and a RCC operation (25-100 ppm vanadium in feed) would show a savings of at least $9,500-$38,000/day.

TABLE E

Catalyst addition rates required to hold vanadium at given levels on a catalyst for feeds with varying levels of vanadium content.

| | | 40,000 BBL/DAY UNIT | | | | |
|---|---|---|---|---|---|---|
| | | Level of Equilibrium Material | | | | |
| Total Vanadium PPM | Lbs. Vanadium Day | 5,000 0.5% | 10,000 1.0% | 20,000 2.0% | 30,000 3.0% | PPM WT. |
| | | Daily Tonnage Replacement | | | | |
| 400 | 5200 | 500 | 250 | 125 | 82 | |
| 200 | 2600 | 250 | 125 | 65 | 42 | |
| 100 | 1300 | 125 | 63 | 32 | 21 | |
| 50 | 650 | 63 | 32 | 16 | 10 | |
| 25 | 325 | 32 | 16 | 8 | 5 | |
| 1 | 13 | 1.25 | 0.63 | 0.32 | 0.21 | |

TABLE F

| | | | FEED-40,000 Bbl/Day; 1 Bbl = 335 Lbs.; Sacrificial Trap cost = $2/lb. | | | | |
|---|---|---|---|---|---|---|---|
| | | | SACRIFICIAL TRAP | 10,000 ppm | 20,000 ppm | Sacrificial | |
| Vanadium in PPM | Lb. V/ Bbl. | Lb. V/ Day | Lb./Day[3] | Cost ¢/Bbl. | Cat Cost $ Day[1] | Cat. Cost $/Day[1] | Trap $/Day | Saving $/Day[2] |
| 1 | $3.35 \times 10^{-4}$ | 13 | 130 | 0.65 | 1,300 | 650 | 260 | 390 |
| 25 | $8.4 \times 10^{-3}$ | 325 | 3,250 | 16 | 32,000 | 16,000 | 6,500 | 9,500 |
| 50 | $1.7 \times 10^{-2}$ | 650 | 6,250 | 32 | 64,000 | 32,000 | 12,500 | 19,500 |
| 100 | $3.4 \times 10^{-2}$ | 1300 | 13,000 | 65 | 126,000 | 64,000 | 26,000 | 38,000 |

[1]Catalyst cost is assumed to be $1/lb. See Table E to obtain catalyst addition rate to maintain catalyst at 10,000 ppm level and 20,000 ppm level;
[2]Catalyst cost savings based on difference between trap cost and difference in catalyst addition rate, (1) minus (2).
[3]Based on observation that 10 lbs. of sacrificial trap immobilizes 1 lb. of vanadium.

The regenerator vessel as illustrated in FIG. 1 is a simple one zone-dense bed type. The regenerator section is not limited to this example but can consist of two or more zones in stacked or side by side relation and with internal and/or external circulation transfer lines from zone to zone.

Having thus described above the observed detrimental effects of vanadium, sodium and nickel on catalyst, sacrificial traps and processes of this invention, the following tests illustrate the effects of nickel and sodium on zeolite neutralization and of vanadia flow and catalyst deactivation through destruction of the zeolite's crystalline structure. It was determined that vanadia deposited on a catalytically active zeolitic cracking catalyst would, under the conditions of elevated temperatures in the regenerator zone, enter the zeolite and cause destruction of its crystalline structure so as to form a less active amorphous material, with subsequent low activity and selectivity.

This phenomena was evaluated in the laboratory by depositing vanadium and nickel, singly, on a specially chosen candidate catalyst to study its resistance to severe thermal and steaming conditions according to a test sequence designated as calcining, impregnation and steaming (CIS). The test measures the effects of nickel and vanadium deposition on fluid cracking catalysts under severe conditions of hydrothermal treatment. According to the CIS test, fresh catalyst is calcined at 1200° F. for 3 hours in a shallow bed, 100 gms of the dried material is then vacuum impregnated with 0.25, 0.5, 1.0 and 2.0 wt% of added nickel or vanadium. Either aqueous solutions of the metal salt or pentane solutions of metal organic complex are employed. Excess solvent is removed at 0.1 mm Hg pressure. The impregnated catalyst is oxidized at 1000° F. for 3 hours using a shallow bed and muffle furnace. After oxidation, the oxidized material is steamed at 1450° F. for 5 hours according to the Steaming Torture Test of Table D. Samples are then tested for MAT activity, selectivities, surface area, zeolite and metal concentrations.

TABLE D
STEAMING TORTURE TEST FOR ACCELERATED DEACTIVATION OF FLUID CRACKING CATALYST

PURPOSE:

This method outlines the deactivation procedure for impregnated and oxidized catalyst by hydrothermal treatment before the catalytic cracking activity is determined in the Micro-Activity Test (MAT).

TEST PARAMETERS:

Fluid-bed, quartz reactor, diameter-2.5 cm. ID
Catalyst load - 75 grams
Heat-up rate - 3° C./min.
Nitrogen gas velocity - 0.31 cm/sec. at 788° C.
Steam gas velocity - 10.9 cm/sec at 788° C.
Steam rate - 97% gas

TEST PROCEDURE:

Weigh fresh catalyst.
Charge loaded reactor to furnace at room temperature.
Begin flow of nitrogen at 0.05 SCFH rate.
Heat the reactor at maximum rate and begin the steaming period when 15° C. of desired steaming temperature is reached.
Start a flow of 100% steam at this temperature. Steam flow is continued for 5 hours. A nitrogen flow is used in addition to steam to provide constant fluidization.
Hold reactor at constant desired steaming temperature of 788° C. for duration of steaming.
After 5 hours, stop the steam and nitrogen flow to the reactor.
Remove reactor from furnace and allow to cool in air to ambient conditions.
Submit samples for testing.

CATALYST ANALYSES:

Deactivated catalyst is analyzed for the following parameters:

Surface Area by BET Method
MAT by Micro Activity Test
Mercury Pore Volume
Zeolite, Percent Relative Intensity to Na—Y by X-Ray diffraction As shown in FIGS. 2 through 9, the overall effect of nickel and sodium is to neutralize acid sites and increase coke and gas production, but little or no destruction of the zeolite crystalline cage structure was observed. Vanadium, on the other hand, was irreversibly destructive. At suitably severe conditions, as the vanadia content was increased, zeolite content decreased proportionally to the point that at approximately the 1 wt% vanadium level, the zeolite crystalline structure was completely destroyed after 5 hours contact at 1450° F. with 100% steam, leading to a completely deactivated catalyst. In FIGS. 6 and 7, "CPF" stands for Carbon Producing Factor and is defined as the ratio of the amount of coke produced by the test catalyst to the amount of coke produced by the standard catalyst at the same conversion level. "HPF" stands for Hydrogen Producing Factor and is defined as the ratio of the amount of hydrogen produced by the test catalyst to the amount of hydrogen produced by the standard catalyst at the same conversion level.

The determination that vanadia deposited on a catalyst would flow and cause coalescence between catalyst particles at regenerator temperatures, and the selection of those elements and their salts which would prevent this process were studied by three methods, namely: the clumping or lump formation technique, vanadia diffusion from or compound formation with a metal additive in an alumina-ceramic crucible, and through spectroscopic studies and differential thermal analyses of vanadia metal additive mixtures.

CLUMPING TEST

A clay, spray dried to yield microspherical particles in the 20 to 150 micron size, had vanadia deposited upon it in varying concentrations. Clay free of vanadia and clay containing varying vanadia concentrations were placed in individual ceramic crucibles and calcined at 1,400° F. in air for two hours. At the end of this time period, the crucibles were withdrawn from the muffle furnace and cooled to room temperature. The surface texture and flow characteristics of these samples were noted and the results are reported in Table X.

TABLE X

| $V_2O_5$ Concentration - ppm | Surface Texture | Flow Characteristics |
|---|---|---|
| 0 | Free | Free flowing |
| 1,000–5,000 | Surface Clumped | Broke crust for free flowing |
| 5,000–20,000 | Surface Clumped | Total clumping no flow |

As shown in Table X, the clay free of vanadia does not form any crust or clumps or fused particles at temperatures encountered in the regenerator section of the process described in this invention. At vanadia concentrations of 1,000–5,000 ppm, clumping was observed but the crusts binding particles could be readily broken into free flowing, crusty particles. At vanadia concentrations above 5,000 ppm, the clay begins to clump and bind badly and does not flow at all even with moderate impact. While liquid at operating temperature, manifestation of this phenomenon is demonstrated by the finding that when these coalesced particles are cooled down below their solidification point in a crucible, or in an operating unit cooled down in order to facilitate entrance to the unit for cleaning out plugged diplegs and other repairs, a solid mass of particles is formed which must be forcibly removed. This phenomenon makes turn-around lengthy and complex for an operating unit as this material must be chipped out.

CRUCIBLE DIFFUSION TEST

An extension of the clumping test is the use of a ceramic-alumina crucible to determine whether vanadia reacts with a given metal additive. If vanadia does not react or only a small amount of compound formation occurs, then the vanadia diffuses through and over the porous alumina walls and deposits as a yellowish to orange deposit on the outside wall of the crucible. On the other hand, when compound formation occurs, there are little or no vanadia deposits formed on the outside of the crucible wall. Two series of tests were performed. In the first series shown in Table Y, a 1:1 mixture by weight of vanadium pentoxide and the metal additive was placed in the crucible and heated to 1500° F. in air for 12 hours. Compound formation or vanadia diffusion was as noted in Table Y.

TABLE Y

| 1 Part $V_2O_5$ + 1 Part Metal Additive 1500° F. - Air - 12 Hours | | |
|---|---|---|
| Metal Additive | Diffusion of Vanadium | Compound Formation |
| Titania | No | Yes |
| Manganese Acetate | No | Yes |
| Lanthanum Oxide | No | Yes |
| Alumina | Yes | No |
| Barium Acetate | No | Yes |
| Copper Oxide | Yes | Partial |

In the second series of tests, a vanadia containing material was tested in a similar manner. A one to one ratio by weight of vanadium pentoxide and the metal additive were heated to 1,500° F. in air for 12 hours. The results are shown in Table Z. The material reported in Table Z as containing 24,000 ppm vanadia on clay with no metal additive was fired at 1500° F. and then studied in a scanning electron microscope (SEM). The fused particles initially gave a picture of fused particles. However, as the material was continuously bombarded, the fused particles separated due to the heat generated by the bombarding electrons. One was able to observe the melting and flowing of vanadia as the initial single fused particles separated into two or more distinct microspherical particles.

TABLE Z

| 1 Part $V_2O_5$ - Sorbent + 1 Part Metal Additive 1500° F. - Air - 12 Hours | | |
|---|---|---|
| Vanadia Concentration, ppm | Metal Additive | Particle Formation |
| 24,000 | None | Yes |
| 24,000 | Calcium Oxide | No |
| 24,000 | Magnesium Oxide | No |
| 24,000 | Manganese Oxide | No |

The study of the capability of certain elements to immobilize vanadium pentoxide was extended by use of DuPont differential thermal analyses (DTA), X-ray diffraction (XRD) and scanning electron microscope (SEM) instruments. The metal additives studied on the DTA showed that titania, barium oxide, calcium oxide, the lanthanide series, magnesium oxide and indium oxide all were excellent additives for the formation of high melting metal vanadates, with melting points of 1800° F. or higher. Copper gave intermediate results with compounds melting at approximately 1500° F. Poor results were obtained with materials such as lead oxide, molybdena, tin oxide, chromia, zinc oxide, cobalt oxide, and cadmium oxide.

INDUSTRIAL APPLICABILITY

The invention is useful in catalytic conversion of both FCC and RCC feeds as described above. The present invention is particularly useful in the catalytic cracking of high boiling carbo-metallic feedstocks to lower boiling hydrocarbon fractions in the liquid fuel range. Examples of these oils are reduced crudes and other crude oils or crude oil fractions containing residua as above defined.

Although the catalytic cracking process is preferably conducted in a riser reactor of the vented type, other types of risers and other types of reactors with either upward or downward flow may be employed. Thus, the cracking operation may be conducted with a moving bed of catalyst which moves in countercurrent relation to liquid (unvaporized) feedstock under suitable contact conditions of pressure, temperature and weight hourly space velocity. Alternatively, the feedstock may be passed through alternating fixed beds of catalyst with cycling cracking and regeneration.

Although the preferred contacting operation is catalytic cracking, the catalyst and processes of the invention may be employed in various other types of hydrocarbon conversion operations, such as dehydrocyclization, hydrocracking, hydroforming of naphthene hydrocarbons and the like, polymerization of olefins, depolymerization of polymers, alkylation and dealkylation, disproportionation, reforming of naphthas, isomerization of paraffins and the like, aromatization of paraffins and the like, hydrogenation, dehydrogenation, various types of hydrofining operations in which one or more characteristics of the feedstock are improved by treatment with hydrogen in the presence of a catalyst, and the like types of other contacting and/or conversion processes.

We claim:

1. A catalyst for the conversion to lighter products of hydrocarbon oil feeds which have significant content of metals comprising vanadium, said catalyst comprising particles each containing in combination:

(a) from 10 to about 50 wt% of a matrix material selected from silica, silica-alumina and kaolin clay and combinations thereof;

(b) from 10 to about 40% by weight of a catalytically active crystalline aluminosilicate zeolite said zeolite being a faujasite having a silica to alumina ratio of from about 2.5 to 7.0 and said catalyst having particle sizes in the range of about 10 to 200 micron, and having a MAT value of at least about 60 vol% conversion;

(c) from 1 to about 40% of a sacrificial trap selected from a group consisting of 5A molecular sieve, mordenite, ammonia exchange A sieve, in the hydrogen or ammonium form, chabazite in the hydrogen or ammonium form, pillared interlayered clay, erionite, and derivates thereof in the hydrogen or ammonium form, and combinations thereof; and (d) 5,000 to 30,000 ppm of vanadium equilibrated onto said catalyst;

whereby said sacrificial trap is present in amount sufficient to provide a sacrificial trap to vanadium weight ratio of above about 10:1 when said catalyst is contaminated with about 5,000 ppm by weight of vanadium and wherein all quantities are based on the total weight of the catalyst excluding the metal contamination.

2. A catalyst according to claim 1 wherein said sacrificial trap comprises mordenite in the hydrogen or ammonium form.

3. A catalyst according to claim 1 wherein said sacrificial trap comprises chabazite in the hydrogen or ammonium form.

4. A catalyst according to claim 1 wherein said sacrificial sieve comprises pillared interlayered clay.

5. A catalyst according to claim 2 wherein said mordenite comprises metal exchanged naturally occurring or synthetic mordenite in an amount in the range of about 1 to about 40 weight % and wherein said metal is selected from the group consisting of Mg, Ca, Sr, Ba, Sc, Y, La, Ti, Zr, Hf, Md, Ta, Mn, Ni, In, Tl, Bi, Te, the rare earths, the Actinide and Lanthanide series of elements, and mixtures thereof.

6. A catalyst according to claim 2 wherein said mordenite comprises naturally occurring or synthetic mordenite in an amount in the range of about 1 to 40 weight % and wherein said metal is selected from the group consisting of Hf, Nb, Ta, Mn, Ni, In, Tl, Bi, Te, the rare earths, the Actinide and Lanthanide series of elements, and mixtures thereof.

7. A catalyst according to claim 1 wherein said sacrificial trap comprises a metal exchanged naturally occurring or synthetic chabazite in an amount in the range of about 1 to about 40 weight % and wherein said metal is selected from the group consisting of Mg, Ca, Sr, Ba, Sc, Y, La, Ti, Zr, Hf, Nb, Ta, Mn, Ni, In, Tl, Bi, Te, the rare earths, the Actinide and Lanthanide mixtures thereof.

8. A catalyst according to claim 1 wherein said sacrificial trap comprises metal exchanged pillared interlayered clay in an amount in the range of about 1 to about 40 weight % and wherein said metal is selected from the group consisting of Mg, Ca, Sr, Ba, Sc, Y, La, Ti, Zr, Hf, Nb, Ta, Mn, Ni, In, Tl, Bi, Te, the rare earths, the Actinide and Lanthanide series of elements and mixtures thereof.

9. A catalyst according to claim 1 wherein said sacrificial trap material is selected from a group consisting of 5A molecular sieve, ammonia exchanged A sieve, mordenites, chabazites, pillared interlayered clay or combinations of these trap materials with or without metal exchange in an amount the range of about 1 to about 40 weight % and wherein said metal is selected from the group consisting of Mg, Ca, Sr, Ba, Sc, Y, La, Ti, Zr, Hf, Nb, Ta, Mn, Ni, In, Tl, Bi, Te, the rare earths, the Actinide and Lanthanide series of elements and mixtures thereof.

* * * * *